(12) United States Patent
Rezaeian et al.

(10) Patent No.: US 11,263,241 B2
(45) Date of Patent: Mar. 1, 2022

(54) SYSTEMS AND METHODS FOR PREDICTING ACTIONABLE TASKS USING CONTEXTUAL MODELS

(71) Applicant: Oracle International Corporation, Redwood Shores, CA (US)

(72) Inventors: Amir Hossein Rezaeian, San Mateo, CA (US); Alberto Polleri, London (GB); Stacy Paige Parkinson, Highlands Ranch, CO (US); Tara U. Roberts, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 267 days.

(21) Appl. No.: 16/569,449

(22) Filed: Sep. 12, 2019

(65) Prior Publication Data
US 2020/0125586 A1 Apr. 23, 2020

Related U.S. Application Data

(60) Provisional application No. 62/748,090, filed on Oct. 19, 2018.

(51) Int. Cl.
| | |
|---|---|
| *G06F 7/00* | (2006.01) |
| *G06F 16/28* | (2019.01) |
| *G06N 5/04* | (2006.01) |
| *G06N 20/00* | (2019.01) |
| *G06F 16/23* | (2019.01) |

(52) U.S. Cl.
CPC ........ *G06F 16/285* (2019.01); *G06F 16/2365* (2019.01); *G06N 5/04* (2013.01); *G06N 20/00* (2019.01)

(58) Field of Classification Search
CPC ... G06F 16/285; G06F 16/2365; G06N 20/00; G06N 5/04
USPC .................................................. 707/600–899
See application file for complete search history.

(56) References Cited

U.S. PATENT DOCUMENTS

2013/0103749 A1* 4/2013 Werth ..................... G06F 9/453
709/203

\* cited by examiner

*Primary Examiner* — Isaac M Woo
(74) *Attorney, Agent, or Firm* — Kilpatrick, Townsend and Stockton LLP

(57) ABSTRACT

The present disclosure relates to an intelligent user interface that predicts tasks for users to complete using a trained machine-learning model. In some implementations, when a user accesses the intelligent user interface, the available tasks and a user profile can be inputted into the trained machine-learning model to output a prediction of one or more tasks for the user to complete. Advantageously, the trained machine-learning model outputs a prediction of tasks that the user will likely need to complete, based at least in part on the user's profile and previous interactions with applications.

20 Claims, 14 Drawing Sheets

SYSTEMS AND METHODS FOR PREDICTING ACTIONABLE TASKS USING CONTEXTUAL MODELS

TECHNICAL FIELD

The present disclosure relates to systems and methods that generate predictions of tasks using a machine-learning model, and in some examples, present the predicted tasks to users in an intelligent user interface (UI) that enables the predicted tasks to be selectable and actionable using the interface. More particularly, the present disclosure relates to systems and methods that generate the intelligent UI that presents tasks predicted to be useful to a user, such that the tasks are predicted using the machine-learning model.

BACKGROUND

Cloud or locally hosted applications that perform functionality targeted to specific domains have become increasingly complex. For instance, users often have to navigate long menus within applications to find links to relevant tasks. Further, tasks have also become complex. One task may involve distinct actions that need to be performed across several applications. However, as users are faced with a growing number of tasks to complete in a workday, navigating one or more cloud or locally hosted applications to identify and complete tasks is a tedious and time-intensive process.

SUMMARY

Certain aspects and features of the present disclosure relate to systems and methods for using a trained machine-learning model to predict tasks for users to complete, and to efficiently display the predicted tasks as selectable links on an intelligent user interface (UI). The trained machine-learning model may learn the tasks that users typically perform over time and continuously update itself. A set of all available tasks can be determined by harvesting and evaluating log records across various applications. As a non-limiting example, the log records, which may record users' interactions (e.g., clicks) within applications, may be used to identify all tasks previously completed by users associated with an entity. The log records may capture the metadata of interactions between an application and a user. For example, the metadata may include a user identifier, a task identifier for a task selected to be performed, the application that facilitates performance of the task, and other suitable metadata. Further, a contextual user profile can be created to store various information about a user, such as the user's role, access level, current location, device characteristics, previous interactions with applications, and other suitable information. For example, each time the user accesses the intelligent UI, the full set of tasks and the user profile can be inputted into a trained machine-model to output a prediction of one or more tasks for that user to complete.

In some implementations, to enhance the accuracy of task prediction, the contextual user profiles for a plurality of users associated with an entity can be clustered using one or more clustering techniques (e.g., k-means clustering). Clustering the user profiles may result in the formation of one or more clusters of users. A learner system can evaluate a cumulative accuracy of each of multiple, different machine-learning models (e.g., multi-armed bandit models) and select the most accurate model for each cluster of users. The cumulative accuracy of the selected model is calculated at each iteration of prediction (e.g., each time the intelligent UI is loaded). The learner system can execute the selected machine-learning model at the next instance a user within the cluster loads the intelligent UI. For example, if the model is a multi-armed bandit model, then executing the selected model causes the model to select an incomplete subset of tasks from the set of available tasks. The incomplete subset of tasks may correspond to the tasks predicted for the user to complete. Thus, the iterative selection of a model for each instance the intelligent UI is loaded (e.g., each time tasks are predicted for a user) is semi-online training, instead of standard batch training. In some implementations, the accuracy of a machine-learning model may be increased using a bagging or boosting technique for combining multiple models. Advantageously, selecting the most accurate model from multiple models at each instance of loading the intelligent UI ensures the accuracy of the predicted tasks.

In some implementations, trained machine-learning model can use one or more reinforcement learning techniques to enhance the accuracy of the tasks that are suggested or predicted for a particular user. For instance, the suggested tasks can be enhanced by detecting a feedback signal from the intelligent UI. The feedback signal can indicate which presented tasks the user selected. The machine-learning model can bias future suggested tasks towards or away from certain tasks based on whether or not the user selected the tasks when the tasks were presented as suggestions on the intelligent UI or dashboard. Advantageously, the machine-learning model outputs a prediction of tasks that the user will likely need to complete based at least in part on the user's profile and previous interactions with applications.

In some implementations, the machine-learning model may be generated using one or more machine-learning techniques, such as a multi-armed bandit or a contextual multi-armed bandit in a reinforcement learning approach. The machine-learning model may represent a model of some or all of the users of an entity and their interactions with various applications (e.g., which tasks those users have previously completed). When a particular user accesses the intelligent UI, a learner system may generate a user vector for that particular user. In some implementations, the user vector may be a vector representation of various information about the user. For example, the user vector may include the user's access level, current location, whether the user is working remotely, previous interactions with applications, previous tasks completed using the applications, frequency of completing certain tasks, and other suitable information. The user vector may be fed into the machine-learning model to predict which tasks the user will need to complete (e.g., on a given day). The machine-learning model can output a prediction of one or more tasks that the user will likely need to complete. The machine-learning model prediction is based, at least in part, on the user vector, the set of suggestable tasks, and/or the tasks completed by users with similar attributes (e.g., users in the same location).

In some implementations, a suggestable task may be performed using an application. For example, of the set of all suggestable tasks, a first subset of the set of tasks may be performable by a first application, a second subset of the set of tasks may be performable by a second application, a third subset of the set of tasks may be performable by a third application, and so on. A task may include one or more separate actions that need to be performed to complete the task. As a non-limiting example, the task of completing a form may include the actions of (1) generating a form, (2) completing the form with information, (3) saving the completed form, and (4) submitting the saved form to a destination system. In this example, the task of completing the form includes four separate actions performed by a specific application. In certain embodiments, for example, a "complete form" task may be suggested on the intelligent UI accessed by the user. If the user selects the "complete form" task from the intelligent UI (e.g., selects a link presented on the intelligent UI that represents the "complete form" task), then the selection of the task may automatically trigger the application to perform the four actions associated with the task. Advantageously, one selection on an intelligent UI (e.g., the intelligent UI is not necessarily within any application), can automatically trigger the performance or more than one action at an application.

In some implementations, each instance a user accesses the intelligent UI, a first portion of the interface may present one or more links. For example, each link may correspond to a suggested task that is predicted for the user (e.g., based on a result of inputting the user profile of the user or other contextual information of the user into the trained machine-learning model). In some implementations, the link may be selectable, such that when the link is selected, the one or more actions associated with the suggested task are automatically performed by the appropriate application. For example, when the link is selected, an exposed interface (e.g., an Application Programming Interface) can be used to access the application that corresponds to the suggested task in order to complete the associated action(s). Additionally, a signal representing that a link was selected may be transmitted as feedback to the trained machine-learning model, so that the model may be updated (e.g., may bias prediction towards the selected task).

As non-limiting examples, the data points that can be included in the user vector that is generated when a user accesses the intelligent UI (but before the suggested tasks are presented to the user) may include at least the following: the user's title, the user's security or access level, the user's organization, the user's connections in an internal platform (e.g., an internal platform for linking users together), the user's location, the time of year (e.g., a certain quarter), the proximity to certain events (e.g., the proximity to week's or year's end), the previous tasks performed by the user, the previous applications accessed by the user, the previous interactions between the user and one or more applications to complete tasks, time of day, and other suitable user data. It will be appreciated that the above listing of data points that can be included in the user vector are exemplary, and thus, the present disclosure is not limited thereto.

In some implementations, the trained machine-learning model can provide contextual information in real time to enable tasks to be suggested on a version of the intelligent UI presented to the user. For example, even if a user is new (e.g., there is limited data about previous interactions by the user), the trained machine-learning model can be used to predict tasks on the version of the intelligent UI presented to the new user. The trained machine-learning model can cluster all users into one or more clusters (as described above). For example, one of the clusters may be other new users (e.g., in the past). By evaluating the contextual user data associated with other new users (e.g., which tasks those other new users completed or performed when they started), the intelligent UI can nonetheless accurately predict tasks for the new user to complete. Advantageously, the trained machine-learning model provides a technical solution to the cold start problem, in that even though there may not be much data from the interactions of the new user and various applications (e.g., "thin data"), the trained machine-learning model can nonetheless predict the tasks that the new user will likely need to perform on a particular day. For users who have performed a large amount of tasks, the trained machine-learning model can be used to evaluate the previous tasks performed by the user and predict which task(s) the user will likely need to complete or perform in a particular day.

In certain embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: collecting a plurality of log records stored at one or more servers, each log record of the plurality of log records representing one or more attributes of an interaction between a user device and an application, the application facilitating performance of one or more tasks, and the interaction being associated with a task previously selected by a user using the application; generating contextual user data for each user of a plurality of users, the contextual user data for each user of the plurality of users being generated by aggregating the one or more attributes associated with the user across the plurality of log records. The computer-implemented method also includes performing a clustering operation on the contextual user data of the plurality of users, the performance of the clustering operation causing a formation of one or more clusters of users, and each cluster of the one or more clusters representing one or more users that share a common attribute. The computer-implemented method also includes determining a set of tasks performable using one or more applications, each task of the set of tasks including one or more actions performable using an application of the one or more applications; identifying a plurality of selection models, each selection model of the plurality of selection models indicating a protocol for selecting one or more tasks from the set of tasks, and each selection model of the plurality of selection models being associated with an accuracy; and for each cluster of the one of more clusters. The computer-implemented method also includes selecting a selection model from the plurality of selection models, the selection being based on the accuracy of the selection model as compared to an accuracy of remaining selection models of the plurality of selection models. The computer-implemented method also includes evaluating, using the selected selection model, the contextual user data of the one or more users included in the cluster and the set of tasks. The computer-implemented method also includes in response to the evaluation, executing the protocol associated with the selected selection model to select one or more tasks from the set of tasks, the selection of the one or more tasks corresponding to a recommendation of selectable tasks for presentation to the one or more users included in the cluster. Other embodiments of this aspect include corresponding computer systems, apparatus, and computer programs recorded on one or more computer storage devices, each configured to perform the actions of the methods.

In certain embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: collecting a plurality of log records stored at one or more servers (e.g., the log records of clicks performed by users across various applications), each log record of the plurality of log records representing an interaction between a user device (e.g., operated by any user) and an application (e.g., any cloud or locally hosted application), and the interaction being associated with a task previously performed using the application; determining a set of tasks performable using one or more applications (e.g., all suggestable tasks that can be performed by various applications), each task of the set of tasks including one or more actions performable using an application of the one or more applications; generating a contextual model using the plurality of log records and the set of tasks (e.g., the contextual multi-armed bandit model is generated using the full set of suggestable actions and all of the log records capturing clicks in applications), and the generation of the contextual model including evaluating the plurality of log records and the set of tasks to detect one or more patterns; receiving a communication from a particular user device (e.g., receiving a browser request to load the intelligent UI for a particular user), the receipt of the communication causing an interface (e.g., the intelligent UI) to be displayed on the particular user device; detecting one or more attributes associated with the particular user device, each attribute of the one or more attributes characterizing a profile corresponding to the particular user device; generating a user vector for the particular user device (e.g., a vector representing all of the attributes of the user that will be fed into the contextual bandit model to output the suggested tasks), the generation of the user vector being based, at least in part, on the profile of the particular user device and/or one or more tasks previously performed by a particular application in response to an interaction by the particular user device; inputting the user vector into the contextual model; in response to inputting the user vector into the contextual model, determining a subset of the set of tasks for presenting on the interface (e.g., the suggested tasks to be presented on the intelligent UI), the subset of tasks being determined as an output of the contextual model, and the subset of tasks corresponding one or more tasks predicted to be selected by the particular user device (e.g., the subset of tasks can be the suggested tasks to be presented on the intelligent UI); and presenting the subset of tasks at the interface displayed on the particular user device (e.g., the tasks can be presented on the intelligent UI in any manner, including, but not limited to, being represented as selectable links that, when selected, cause the corresponding actions to be performed by the corresponding application). Other embodiments of this aspect include corresponding computer systems, apparatus, and computer programs recorded on one or more computer storage devices, each configured to perform the actions of the methods.

Various implementations may include one or more of the following features. The computer-implemented method further including: receiving input at the interface, the input corresponding to a selection of a presented task of the presented subset of tasks; and in response to receiving the input, accessing the application associated with the selected task (e.g., the application can be accessed using an exposed interface, such as an API), the application associated with the selected task being configured to perform the selected task. The computer-implemented method may also include identifying, using the application, the one or more actions included in the selected task. The computer-implemented method may also include automatically performing the one or more actions by triggering the application to perform the one or more actions in response to the received input. The computer-implemented method further including: in response to receiving the input, generating a positive feedback signal indicating that the selected task was selected. The computer-implemented method may also include updating the contextual model based on the positive feedback signal, where the positive feedback signal causes the contextual model to bias predicted tasks towards the selected task. The computer-implemented method further including: determining that a task of the subset of tasks presented on the interface was not selected. The computer-implemented method may also include generating a negative feedback signal indicating that the task was not selected. The computer-implemented method may also include updating the contextual model based on the negative feedback signal, where the negative feedback signal causes the contextual model to bias predicted tasks away from the task. The computer-implemented method where the plurality of log records is recorded when an interaction (e.g., a click) is performed at a user device accessing an application of the one or more applications. The computer-implemented method where the set of tasks corresponds to all, or at least some, of the tasks available to be presented as suggested tasks on the interface. The computer-implemented method where the user vector further represents the user data associated with a user operating the particular user device and the interaction data associated with the user, and where the interaction data represents one or more interactions (e.g., a click within an application to perform a task potentially including more than one action) between the particular user device and at least one application of the one or more applications to perform a task. The computer-implemented method where the contextual model is generated using one or more contextual multi-armed bandit machine learning algorithms. The computer-implemented method further including: selecting one or more additional tasks from the set of tasks, each of the one or more additional tasks being selected as part of an exploration strategy to optimize the one or more tasks predicted to be taken by the particular user device, and where the one or more additional tasks are not determined based on a previous task performed in association with the particular user device (e.g., at least one suggested task can be selected and presented as part of an exploration strategy, meaning that the suggested task is randomly selected and not selected based on the previous tasks performed by the user). Implementations of the described techniques may include hardware, a method or process, or computer software on a computer-accessible medium.

Advantageously, certain embodiments of the present disclosure provide a technical solution that predicts tasks that users will likely need to complete or perform based on the contextual information of that user (e.g., the previous tasks that the user has performed in the past) and/or the contextual information of other users (e.g., the previous tasks that other similar users have performed in the past). Further, the technical solution described above and herein solves the technical problem of systems not having sufficient data on certain users (e.g., new users). However, this technical solution can nonetheless predict relevant or useful tasks for new users by clustering all users and selecting the most accurate a trained machine-learning model for every cluster and at instance the intelligent UI is loaded, enabling the system to accurately predict tasks for users.

BRIEF DESCRIPTION OF THE DRAWINGS

The specification makes reference to the following appended figures, in which use of like reference numerals in different figures is intended to illustrate like or analogous components.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
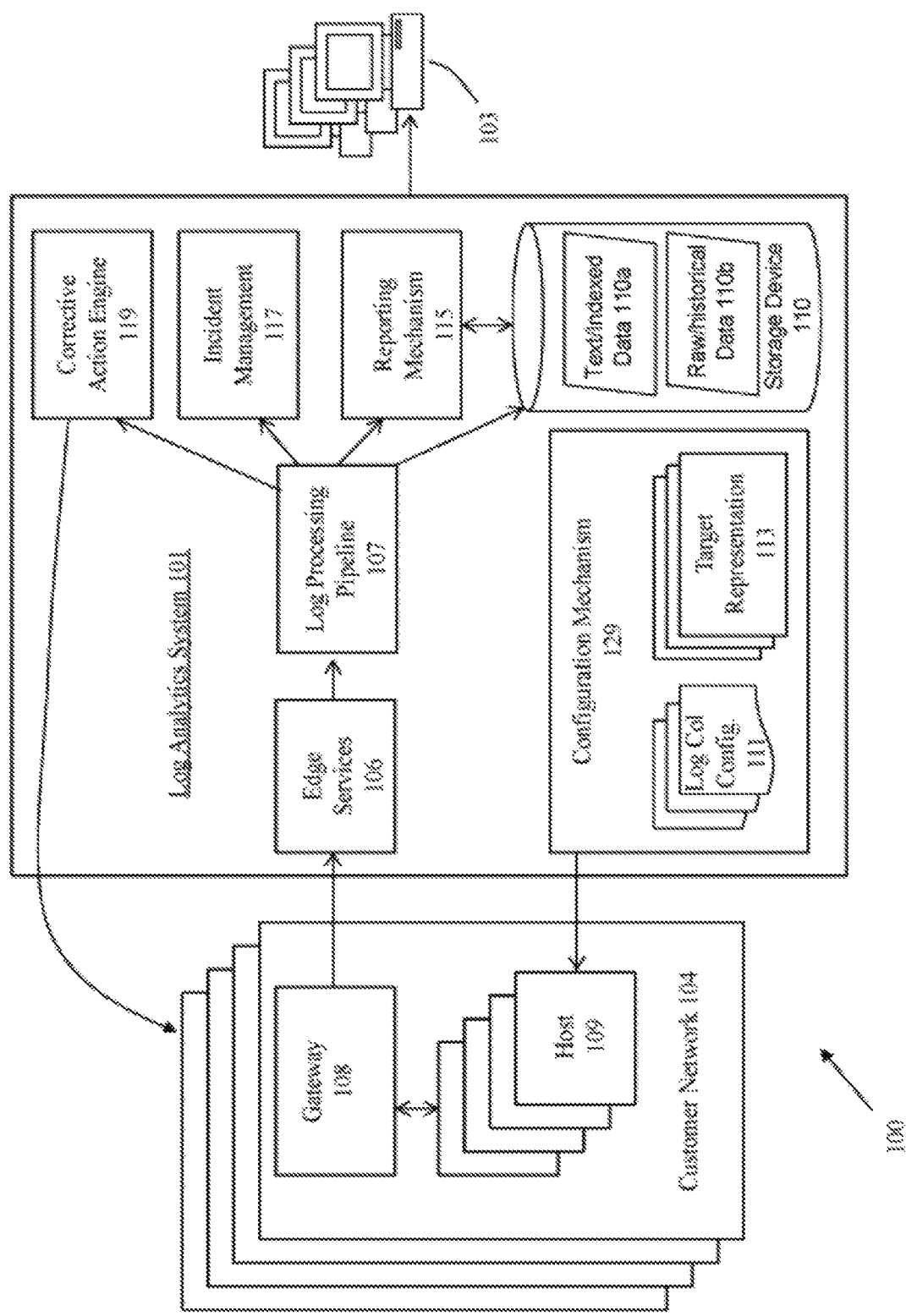
FIG. 1A illustrates an example system for configuring, collecting, and analyzing log data according to some embodiments of the present disclosure.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
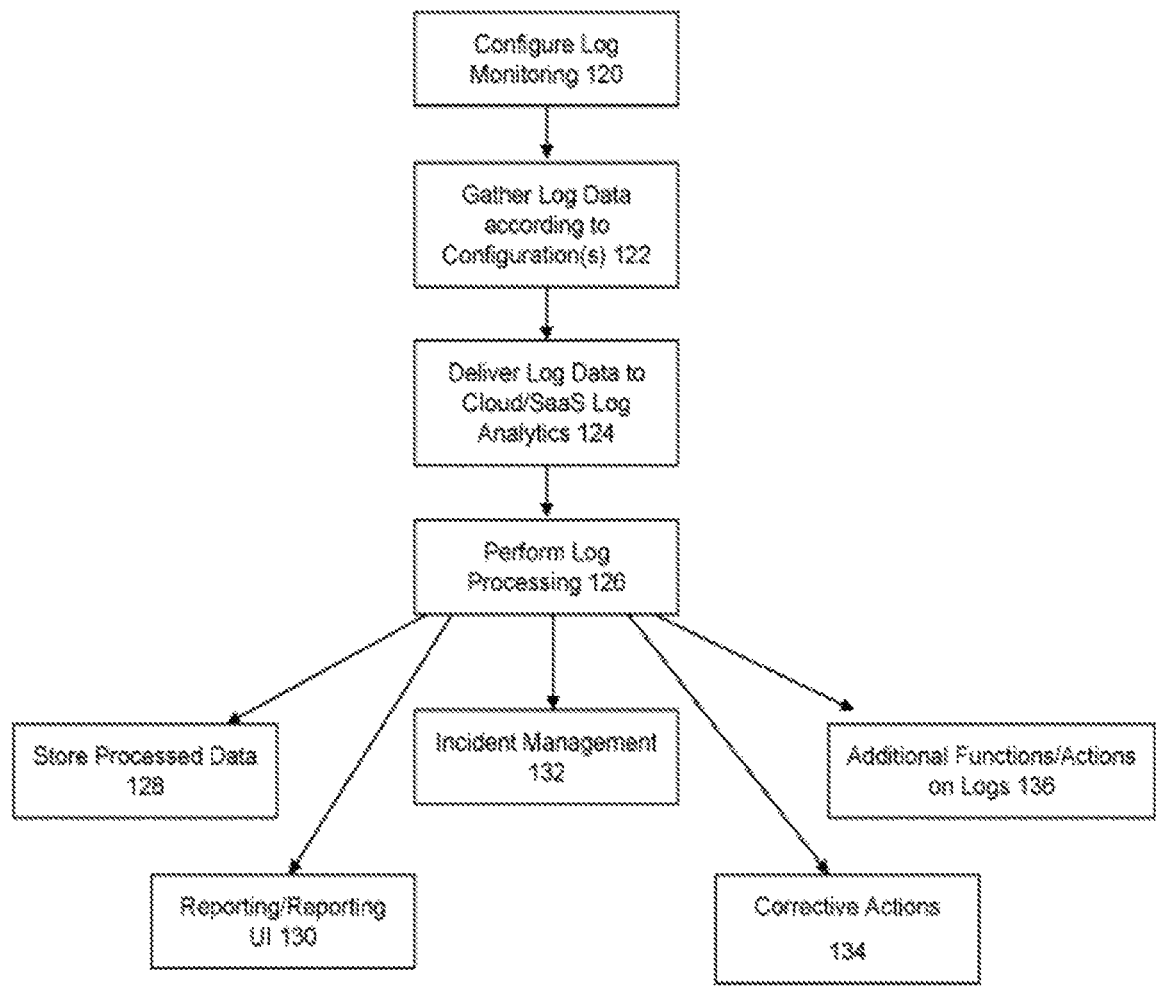
FIG. 1B illustrates a flowchart of an approach to use a system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source local search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
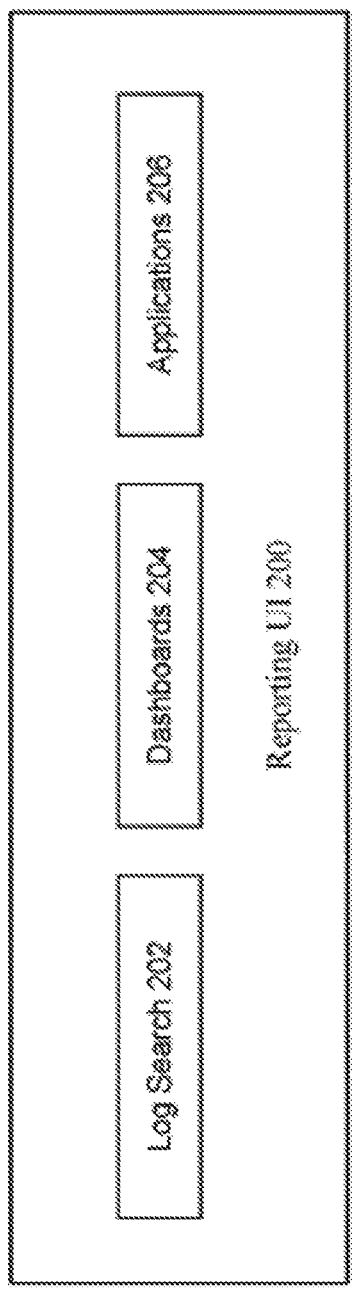
FIG. 2 illustrates an example of a reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
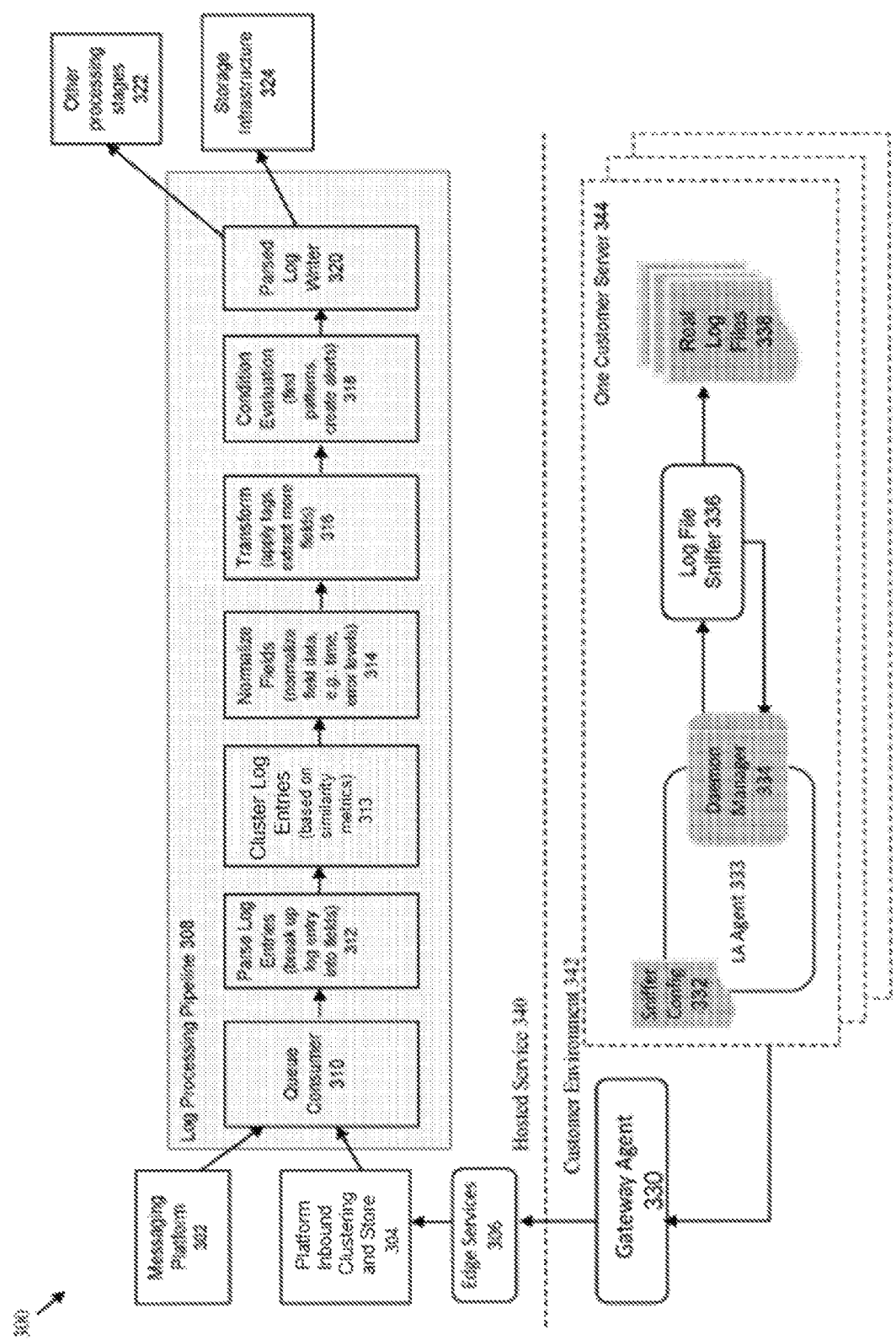
FIGS. 3A-3C are flow diagrams illustrating the internal structure of the log analytics system at a host environment.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case un-abbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
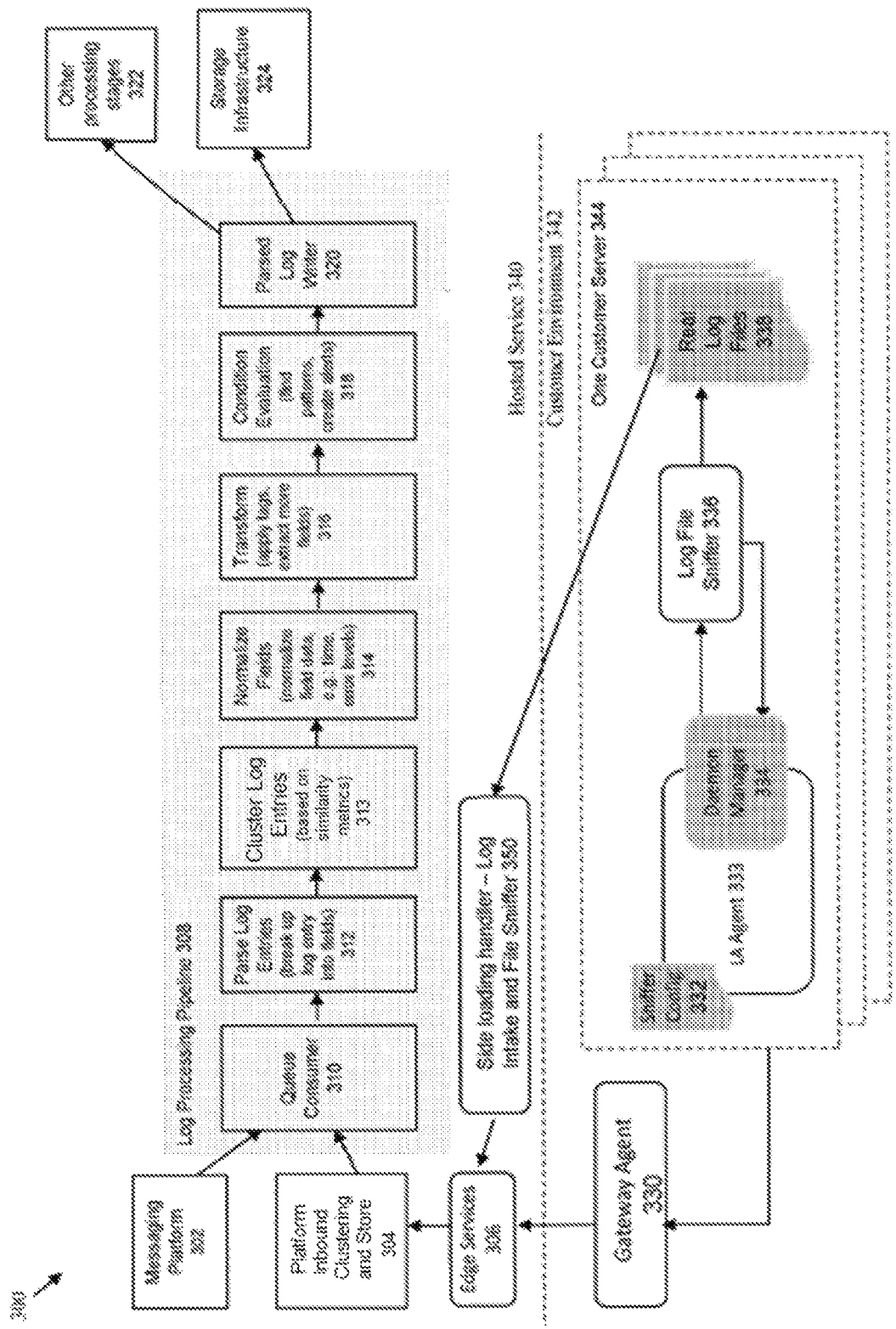
Figure 3C:
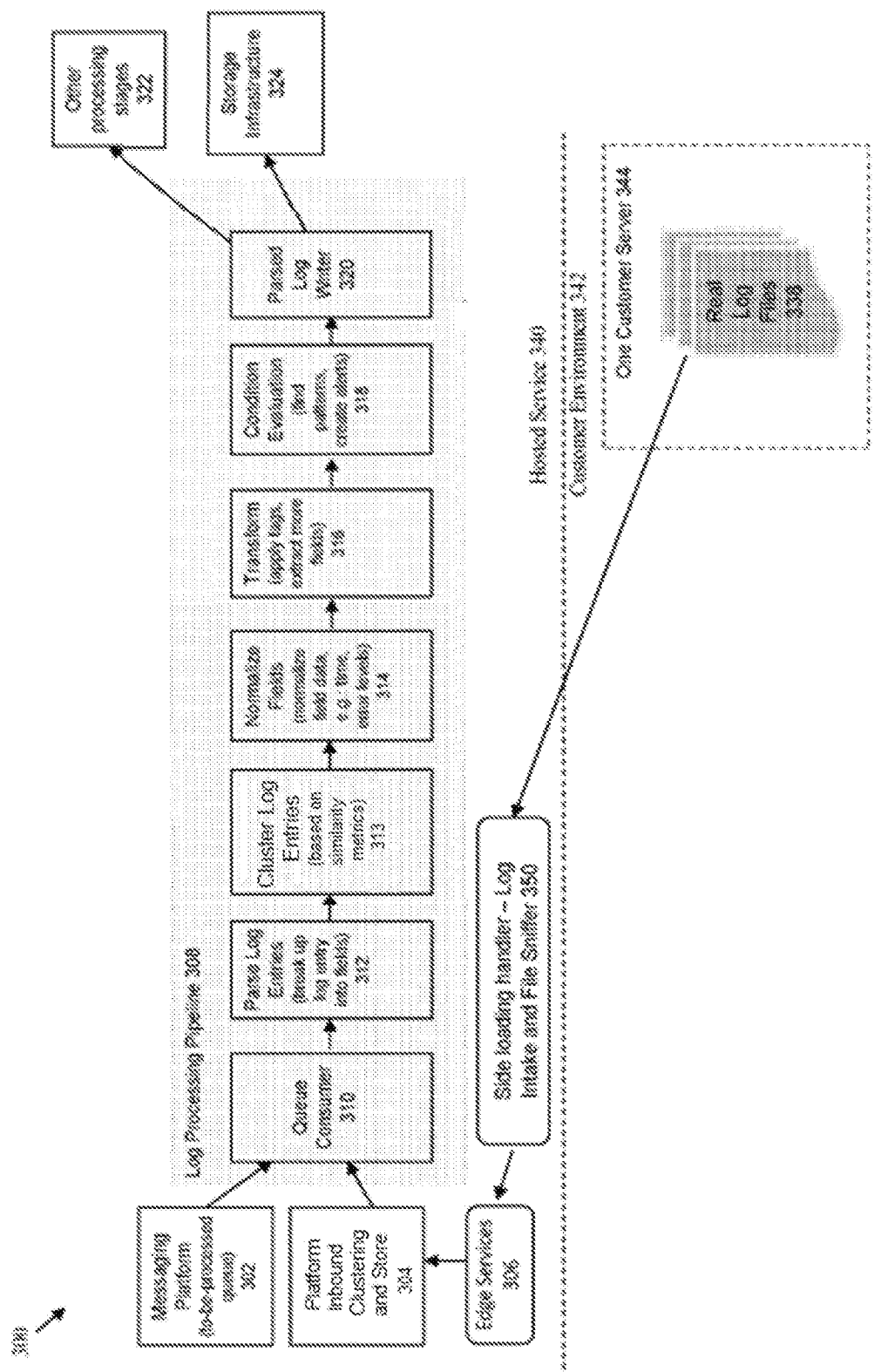

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

User experience is becoming increasingly important in cloud or locally hosted applications that perform functionality targeted to specific domains. Browsers enable users to access and navigate cloud or locally hosted applications. A technical challenge arises in filtering through the vast number of tasks available to users through these applications. Certain embodiments of the present disclosure provide an interface (e.g., that may or may not be part of any particular application) that provides links to suggested tasks the user is likely to need on a particular time or day. The suggested tasks are provided to filter through the noise of the large volume of tasks available in applications. The suggested tasks may be determined based on a contextual model that analyzes the user's history of interactions with various applications and/or other contextual data.

In some implementations, when a user accesses an interface, the interface presents the most relevant tasks that the user will likely perform. A contextual learner can learn the tasks that the user is likely to perform based, at least in part, on the previous tasks that the user has performed. The suggested tasks on the homepage solve the burden of navigating large menus within applications by anticipating the tasks that the user will need to perform using artificial intelligence and/or machine learning techniques.

To illustrate and only as a non-limiting example, when a user logs in to the homepage, a first portion of the homepage may include one or more links to tasks performable by applications, and a second portion of the homepage may include one or more links to tasks (e.g., potentially random tasks) that are not based on the user's previous tasks, but rather are selected as an exploration strategy. If the user selects a presented link, a feedback signal is generated and detected at a contextual learner. The contextual learner then biases future suggested tasks towards the selected task. For example, if the user selects a task from the second portion of the homepage (e.g., the tasks that are presented as part of an exploration strategy of the contextual learner), then the contextual learner will receive a feedback signal causing the contextual learner to bias future suggested tasks towards the selected task.

In some implementations, the contextual learner may be contextual multi-armed bandit learner that is trained using a user profile to obtain the context of a user. The user profile can include, for example, the user's organization, the user's role, the user's position, and/or other suitable information. Further, the contextual learner can be trained on all available tasks that can be suggested to users. The full set of tasks can be gathered by harvesting interaction data associated with each of a plurality of applications. For example, interaction data can include clicks by users using an application and/or other interactions performed by users within an application. A click by a user within an application may cause a task to be performed within that application. The click and other data characterizing the click (e.g., which task was clicked on and performed by the user) can be recorded as a log record for each user across a network associated with an entity. The log records can be recorded for all applications. Over time, the log records can be harvested and evaluated to analyze all of the tasks and/or actions that were completed by clicks or other interaction, such as a tap or swipe. Additionally, the log records can also be evaluated for a specific user to identify the most frequent tasks that the user will or is likely to perform. The contextual learner can create a user context (e.g., a user vector) based, at least in part, on data representing the previous tasks performed by the user, and evaluate the user context in light of the set of tasks to predict which tasks the user is likely to select at a given time or day.

In some implementations, a reinforcement learner, such as the contextual multi-armed bandit learner can be used to generate the contextual model that suggests tasks for users. The reinforcement learner can capture and evaluate user information of a user accessing an interface and action information (e.g., previous tasks and/or actions completed). Further, the reinforcement learner can use online learning techniques to learn how the user is likely going to choose tasks to perform based on the previous tasks performed.

In some implementations, the contextual model can be generated using a reinforcement learning technique that trains the contextual model using the user profiles of the users and/or the log records representing the user interactions with applications. Further, the contextual model with reinforcement learning optimizes the suggested tasks presented on the homepage by letting the output of the contextual model serve as a dynamically chosen task and/or action to suggest to the user. In some implementations, the contextual model with reinforcement learning (e.g., an exploration strategy that dynamically determines between suggesting tasks based on previous user tasks and suggesting tasks randomly or at least not necessarily based on previous user tasks). As a non-limiting example, the homepage incorporates a subcomponent of exploration in random way to determine how users interact with those random suggested tasks. In some implementations, the contextual model can add weights to tasks and/or actions (e.g., actions included in a task) that the user does not select or does not select often (e.g., the tasks that the user does not favor). The weights can be used to bias future decisions of choosing tasks. Further, the weights can be used to dynamically choose when and at which percentage to explore (e.g., suggest random tasks) and exploit (e.g., suggest tasks based on the user's user profile and previously performed tasks, or suggest tasks outputted by the contextual model after processing the user vector generated for the user). Advantageously, the contextual model with reinforcement learning becomes more accurate after each suggestion. Initially, one or more tasks may or may not be suggested as explored tasks.

In some implementations, the contextual model can be continuously updated based on signals received from the homepages or dashboards. For example, when a user requests access to the homepage, a user vector is generated for the user, inputted into the contextual model, and one or more suggested tasks and/or explored tasks are presented to the user. However, when the user selects a particular suggested task presented on the homepage, the homepage can generate a signal that is transmitted to the contextual model as a feedback. For example, clicking a suggested task (e.g., presented as a link) may be a reward that is fed back to the contextual model with reinforcement learning. Upon receiving the feedback signal indicating that a particular task was selected, the contextual model is updated for that particular user to indicate a bias towards selection of that particular task. As a result, that particular task may be presented more often during future instances of presenting suggested tasks on the homepage. Similarly, when a task is not selected (e.g., no feedback signal is received), the contextual model can bias towards not selecting those tasks (e.g., not presenting those tasks as suggestions). In some implementations, the signals that are sent back to the contextual model as feedback (e.g., the rewards) can be defined by a user. Further, the contextual model can be updated to learn and train the contextual model to optimize so as to find the best similar type of reward in the long term. In some implementations, the contextual model with reinforcement learning can use an exploration strategy for which the percentage of explored actions are preset (e.g., epsilon greedy). In some implementations, a fixed percentage of explored actions may not be used (e.g., epsilon greedy may not be used), but rather, the percentage of explored tasks (e.g., tasks that are suggested randomly) and the percentage of exploited tasks (e.g., tasks that are suggested using the contextual model) can be dynamically determined. For example, as a user uses the homepage more, the percentage of explored tasks presented on the homepage may progressively decrease.

When a user has not logged into the homepage before, the user vector that is generated for that user may not contain much data (e.g., at least a few characteristics, such as the user's position and salary may be contained in the user vector). The contextual model can be used to identify which tasks were previously suggested, for example, for similar users, for users located at the same office, for users in the same department or organization, a default list of tasks, and the like. Advantageously, the embodiments described herein provide a multi-user learning capability, in that the contextual model learns how users perform tasks, and a particular user's user vector can be compared against those users and/or the particular users previously completed tasks to predict which tasks that the particular user is likely to perform at a given time, day, week, month, quarter, or year.

In some implementations, a user may be responsible for managing other users. In these cases, the user may need to access various applications because certain applications perform certain tasks (e.g., an application to view details of your team, an application to update general ledger entries, an application displays a list of patents, etc.). Advantageously, even though the users may need to perform tasks that are performable using different applications (e.g., a first task can only be performed by a first application and a second task can only be performed by a second application), the various tasks are still presented for that user as suggested tasks that can be triggered and completed from the interface.

In some implementations, the homepage may display a suggested task (e.g., either an explored task or an exploited task) as a selectable link. Further, an API may be configured to enable a user to select a link (corresponding to a suggested task) displayed on the homepage, and to perform the corresponding task using the application configured to complete that particular task. In some implementations, the link, when selected, may navigate the user to the application at the interface page that enables the user to perform the selected task. In other implementations, the link, when selected, can actually cause the application to perform the selected task and/or the actions associated with the selected task using the API.

It will be appreciated that each application available for performing task may include one or more servers that continuously monitor the navigational transitions (e.g., reload, back, forward, etc.) within the application and/or the clicks that are performed within the application. Each of the navigational transitions and/or the clicks can be recorded in a log record, along with other parameters or characteristic data, such as an identifier of a task that was selected by a click, the interface page that was displayed on a user's computer screen in response to a click, and other suitable information. The present disclosure is not limited to the monitoring (e.g., the collection) of navigational transitions and/or clicks within applications. Other data may be monitored within applications, in lieu of or in addition to the navigational transitions and the clicks, including but not limited to, text or keystrokes entered into input elements displayed within the application, taps or swipes detected when the user uses a mobile device, such as a smartphone, and/r sensor data from any sensors on a mobile device, such as gyroscope data from the gyroscope sensor.

In some implementations, for an application that monitor clicks received within the application, the application can monitor all of the events that occur (e.g., a click) within each Document Object Model (DOM) of the application or of an interface page within the application. The events that occur within the application can be recorded and stored as a log message at a central server (e.g., at a shared location), such that the log messages are available to other applications for analysis and processing. As a non-limiting example, a log message may include a descriptor of the event that occurs (e.g., a click or tap), the DOM element in which the event occurs, any tasks associated with the DOM element in which the event occurred, a timestamp of the event, an identifier of the user performing the event, and other suitable information. The log messages (used interchangeably herein with a log record) can be evaluated using the contextual model to identify patterns of users and the corresponding tasks they perform. Further, for a given user, the log messages that contain that user's identifier can be evaluated to predict which tasks that user performs will need to perform in the future (e.g., by identifying the most frequently performed tasks). For example, future suggested tasks for a particular user can be biased towards tasks that the particular user performs frequently.

In some implementations, each link displayed as a suggested task on a homepage may be configured to use an API to access an application. In some implementations, the link, when selected by a user, may cause the API to navigate the user from the homepage to a specific DOM node (of a DOM tree) or interface page within the application. In some implementations, the link, when selected by the user, may cause the API to automatically access the application and perform the corresponding actions (e.g., without needing to navigate the user to the application). As only a non-limiting example and for the purpose of illustration, if every Friday a user clocks out before he or she gets paid, then when the user accesses the homepage on a Friday, the homepage will be reconfigured to display a link to the task of clocking out (e.g., the link to clocking out may not statically be displayed on the homepage, but rather, may dynamically be displayed on the homepage on Fridays only). If the user selects the link to the suggested task of clocking out, then the user may not be navigated to the corresponding application, but rather the API may convert the selection of the link into an action (e.g., saving and submitting a time card) and perform that action for the user. It will be appreciated that different applications may expose different functionality using an API. Whichever functionality is exposed by an application, however, can be triggered from the homepage, which may not be an interface page within the application. Notably, the API may access the application if a link to a suggested task is selected, however, in some implementations, the user may not be navigated to the application away from the homepage (e.g., the user can remain on the homepage and the action can still be performed within the application by invoking the API). According to certain embodiments, because a set of all tasks and/or actions that can be performed is obtained and stored in one or more data structures, the tasks within a DOM element can be identified. For example, the set of suggestable tasks can be used identify which particular node with a DOM tree corresponds to a particular task, and the log records can be used to identify which DOM element that a user has previously clicked on within the DOM tree within an application at a previous time.

For the purpose of illustration and only as a non-limiting example, if the log records indicate that a particular user frequently accesses a logout page within an application, the contextual model can predict that the user will need to access the logout again in the future. Accordingly, the homepage may display a suggested link to the logout page of the application. If the user selects the suggested link in the homepage, then the API can trigger the logout functionality by performing the logout task without needing to navigate the user to the logout page (e.g., the user can log out of a cloud or locally hosted application by selecting the link while within a homepage that is not a part of the cloud or locally hosted application). As a further non-limiting example, the contextual model can evaluate the tasks performed by similar users (e.g., using likeness on the basis in the same office, same job, same department, same access, same time of the day, same quarter, etc.), and predict a task for the particular user based on these similar users.

Figure 4:
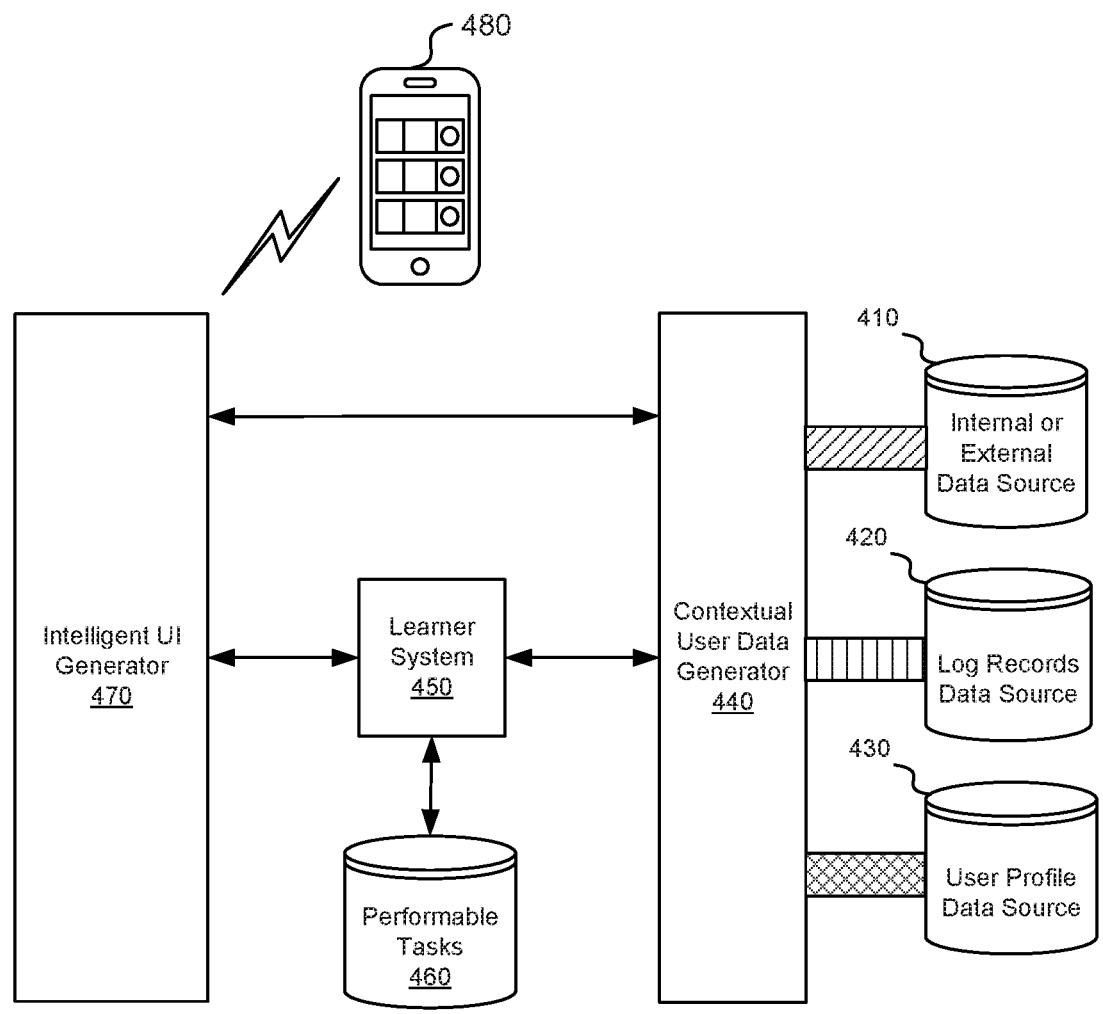
FIG. 4 is a block diagram illustrating an example network environment.

FIG. 4 shows an example network environment 400 that enables an interface associated a cloud network to display suggested tasks for users. In some implementations, network environment 400 may include user device 480, contextual user data generator 440, learner system 450, performance tasks 460, and intelligent UI (user interface) generator 470.

While user device 480 is shown as a mobile device (e.g., a smartphone), it will be appreciated that user device 480 can be any computing device that is operated by a user. User device 480 can access an interface. For example, the interface may display various links and/or context relevant to the users. According to certain embodiments of the present disclosure, intelligent UI generator 470 can generate an intelligent UI to be displayed on a screen of user device 480. The intelligent UI may be configured to dynamically display links to tasks suggested for the user operating user device 480.

When user device 480 initially requests access to the homepage (e.g., a browser running on user device 480 accesses a web server associated with the homepage), the intelligent UI generator 470 transmits a signal to contextual user data generator 440 requesting one or more suggested tasks to display on the intelligent UI. Upon receiving the signal, contextual user data generator 440 can generate a user vector, which includes characteristics of the user. For example, the user vector can be a vector of data that is generated based on a user profile of the user. Non-limiting examples of data that can be stored in the user profile includes the user's job title, department, organization, and/or access level. As shown in FIG. 4, contextual user data generator 440 can access one or more data sources (at the time of receiving the signal from intelligent UI generator 470 and before generating the user vector) to generate the user vector. The one or more data sources may include, but is not limited to, internal or external data source 410, log records data source 420, and/or user profile data store 430. For example, internal or external data source 410 may include any data source that is internal or external to a network, such as a third-party data source. Log records data source 420 may be a data source that stores the log records that contain interaction data (e.g., user clicks within applications) monitored from the various applications available within the network. User profile data store 430 may include one or more servers that store the data contained in the user profiles of users associated with an entity. It will be appreciated that the various applications described herein may be, for example, web applications.

The user vector can then be inputted into the learner system 450 to generate one or more predictions of tasks to suggest to the user. In some implementations, the learner system 450 can also access performable tasks 460 to retrieve a set of all of the actions that can be suggested. Performable tasks 460 can determine the set of tasks by evaluating the log records recorded across the various applications. The log records can be analyzed to indicate the total set of tasks performed by users associated with an entity. With access to performable tasks 460 and the user vector from contextual user data generator 440, contextual learner can generate suggestions of tasks for the user. The suggested tasks would serve as a prediction of tasks that the user will likely need to perform on a given time or day.

Learner system 450 can include one or more models that are generated using machine-learning and/or artificial intelligence techniques. In some implementations, learner system 450 can perform a clustering operation on the contextual user data. As a non-limiting example, learner system 450 may perform k-means clustering on the contextual user data representing a plurality of users. Performing k-means clustering on the contextual user data may result in one or more clusters of users. It will be appreciated that the present disclosure is not limited to performing k-means clustering as the clustering operation, and thus, any suitable clustering techniques may be executed by learner system 450 to cluster the contextual user data. Once the one or more clusters of users are identified, learner system 450 may execute a multi-armed bandit algorithm for each cluster of users (e.g., a cluster of contextual user data representing a specific group of users). Executing the multi-armed bandit algorithm for a cluster of users may result in the selection of one or more tasks for each cluster of users. The one or more tasks identified as a result of executing the multi-armed bandit algorithm may correspond to task(s) predicted for each user in the cluster of users. A different multi-armed bandit algorithm may be executed for each cluster of users. Further, the one or more tasks selected by executing the multi-armed bandit may be different for each cluster of users.

In some implementations, the multi-armed bandit algorithm that is executed may be selected from amongst a plurality of multi-armed bandit algorithms at every instance in which predicted tasks are requested. The selection of the multi-armed bandit algorithm may be based on an accuracy of the multi-armed bandit algorithm. The accuracy of a multi-armed bandit algorithm may be calculated as a cumulative accuracy over every instance in which tasks were selected using the multi-armed bandit algorithm. For example, at one instance, learner system 450 may select a multi-armed bandit algorithm for execution on a cluster of contextual user data and the available set of tasks. Executing the selected multi-armed bandit algorithm may result in the selection of a subset of tasks from the available set of tasks. Each of the selected subset of tasks may be presented to a particular user, and that user can select one or more of the subset of tasks, which are predicated as being tasks that the user may be interested in performing. If, however, the user selects a task from the subset of tasks, then the selection of the tasks causes a signal to be transmitted to learner system 450 indicating a positive selection of one of the subset of predicted tasks. In this scenario, the particular multi-armed bandit algorithm that was executed to select the subset of tasks is updated by at least updating the accuracy associated with that multi-armed bandit algorithm. Over time, the most accurate (e.g., the best) multi-armed bandit algorithm would be selected for each instance the selection of predicted tasks is performed.

In some implementations, learner system 450 may include a model, such as a contextual multi-armed bandit model with reinforcement learning techniques that optimizes the tasks displayed on an interface. The reinforcement learning can enable the contextual model to dynamically determine the percentage of suggested tasks that are explored (e.g., randomly chosen) and the percentage of tasks that are predicted based on the user's previous task history and/or the task histories of other users. The contextual model can be updated based on feedback signals received from users homepages when suggested tasks are selected. In some implementations, machine-learning algorithms or techniques used for the contextual model can include an ensemble of multi-label classifiers (e.g., supervised learning), artificial neural networks (including backpropagation, Boltzmann machines, etc.), bayesian statistics (e.g., bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, learner system 450 can retrieve one or more machine-learning algorithms stored in a data store (not shown) to generate an artificial neural network in order to identify patterns or correlations within a data set of all performable tasks and/or the user vector or any other data set. As a further example, the artificial neural network can learn that when a data object (in the data set) includes value A and value B, then value C is predicted as relevant data for the user who originally transmitted the data object. In yet another example, a support vector machine can be used either to generate output data that is used as a prediction, or to identify learned patterns within the data set.

Figure 5:
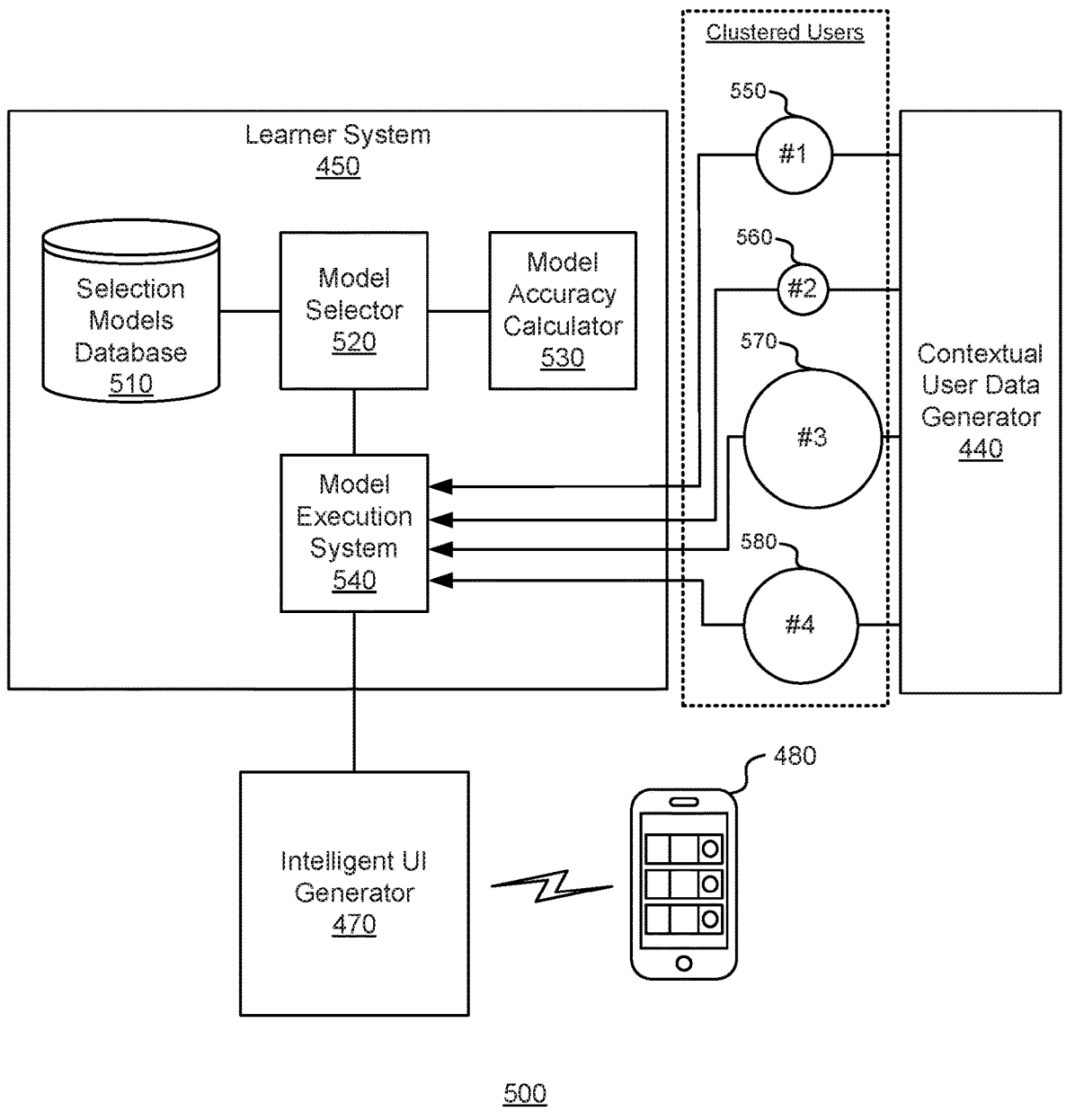
FIG. 5 is a block diagram illustrating an example network environment for predicting tasks that users may be interested in performing based on contextual user data associated with the users.

FIG. 5 is a block diagram illustrating an example network environment for predicting tasks that users may be interested in performing based on previous tasks performed by the users. FIG. 5 illustrates network environment 500, which may include contextual user data generator 440, learner system 450, intelligent UI generator 470, and user device 480. As described above in FIG. 4, contextual user data generator 440 may store user data that is contextual to each user of a plurality of users. For example, a user from the plurality of users may have previously used an interface on many occasions to select a plurality of tasks to perform. Selecting a link presented on the interface (e.g., a UI generated by intelligent UI generator 470) may initiate performance of the corresponding task including one or more actions. Each instance a link is selected by the user, intelligent UI generator 470 may transmit a signal to learner system 450 to notify learner system 450 that the link has been selected. Learner system 450 can use one or more machine-learning algorithms to train a machine-learning model that analyzes the previous tasks selected by the user to generate a prediction of which tasks the user may be interested in performing in the future. The UI can present those predicted tasks (e.g., the links corresponding to the tasks) to the user.

In some implementations, to predict tasks for the user, learner system 450 be a computing network including at least one server, selection models database 510, model selector 520, model accuracy calculator 530, and model execution system 540. The at least one server may be configured to store executable code that, when executed, causes model selector 520 to automatically select a selection model (e.g., a multi-armed bandit model) from selection model database 510 based on an accuracy of the various models calculated by model accuracy calculator 530, and executing the intelligently selected model to select a subset of tasks from the set of all available tasks.

Selection models database 510 may be one or more databases that store all or at least some, but less than all, of the available selection models that can be used to intelligently select tasks for users. Selection models database 510 may store executable code that, when executed, runs the selected model to generate a prediction of tasks for a user. Model selector 520 may retrieve the code corresponding to the selected model, and model execution system 540 may execute that retrieved code. Non-limiting examples of selection modes stored at selection models database 510 may include multi-armed bandit models (e.g., multi-armed bandit algorithms), such as the upper confidence bound model, linear associated reinforcement learning model, epsilon greedy model, Thompson sampling model, contextual multi-armed bandit model, and any other suitable multi-armed bandit algorithms.

Model selector 520 may include a processor configured to execute code that selects the best performing (e.g., most accurate) selection model from amongst the various selection models stored in the selection models database 510. Further, model selector 520 may select a selection model for each round of the multi-armed bandit models. For example, a round of a multi-armed bandit model may correspond to an instance that a user loads the intelligent UI that is configured to present a predicted subset of tasks from the set of available tasks. Each instance the user loads the intelligent UI (generated by intelligent UI generator 470), while the intelligent UI is loading, model execution system 540 may execute the selection model selected by model selector 520 during the last round. Executing the selected selection model may cause model execution system 540 to generate an output representing a subset of tasks from the available set of tasks. The subset of tasks may represent the tasks that are predicted for the user. Further, the subset of tasks may be presented to the user on the intelligent UI, such that each task of the subset of tasks is represented by a selectable link. If a selectable link is selected by a user viewing the intelligent UI, the selection of the link may cause the task to be performed. For example, selecting the selectable link may cause the intelligent UI to access the application that can perform the selected task and to automatically initiate performance of the task by the application. Additionally, model selector may determine the performance (e.g., the accuracy) of each selection model by accessing model accuracy calculator 530.

Model accuracy calculator 530 may track the performance (e.g., accuracy) of each selection model stored in selection model database 510. Learner system 450 may perform online machine learning because training data becomes available to learner system 450 in sequential order after tasks are selected by users viewing the intelligent UI. In some implementations, model accuracy calculator 530 may be configured to calculate a cumulative accuracy or performance for each model at each round of task selection. Further, in some implementations, calculating the accuracy or performance of a selection model may be based on whether or not one of the subset of tasks predicted for the user is actually selected by that user. In some implementations, learner system 450 may calculate the accuracy of each multi-armed bandit selection model by executing an offline replay method as an online evaluation of the various multi-armed bandit models. The replay method may be data-driven and may provide an unbiased evaluation of bandit models via historical logs. For example, the replay method may include determining in a replay buffer whether the recommendation predicted by the model is identical to the information included in one or more historical logs. If so, then the corresponding reward of the event is taken into account for computing the accuracy of that model (otherwise, that event is discarded from the buffer since there may be insufficient information about that event). The replay method may yield increasingly accurate results as the number of events (e.g., data points) increases. The accuracy may indicate a success rate of a model in predicting tasks for users. The accuracy may be recalculated each instance the selection model is executed to select the one or more tasks for presenting to the user.

Model execution system 540 may execute the selected multi-armed bandit model (e.g., the model selected by model selector 520 at the last round of prediction) by processing the contextual user data for a user and the set of available tasks to generate the subset of tasks predicted for that user. Contextual user data generator 440 may process the log records stored across one or more servers. A log record may include data captured during an interaction (at one more or another) between a user of the plurality of users and an application. For example, the log records may have captured each click by the user while the user was navigating the intelligent UI or an interface generated by an application of the plurality of available applications with which users can interact. If the user previously selected a link within an application to initiate performance of a task, metadata about that link selection would be captured in a log record (e.g., metadata, such as user identifier, timestamp, task identifier, application identifier, and so on). Contextual user data generator 440 may process the plurality of log records by aggregating, for each user of the plurality of users, all log records that involve an interaction with that user (or with a user device operated by that user). For example, if a log record is structured to include a data field with a value representing a user identifier for a user interacting with an application, contextual user data generator 440 may aggregate all log records that include the value of a particular user identifier and store the aggregated user data as contextual user data associated with the user identifier. Contextual user data generator 440 may generate contextual user data for each user of the plurality of users using the procedure described above.

Learner system 450 may execute one or more clustering operations (e.g., execution of k-means clustering) on the contextual user data generated for the plurality of users. Clustering the contextual user data may result in the formation of one or more clusters of users. Each cluster of users may represent one or more users of the plurality of users, and each of the one or more users may share a common or related attribute from the log records (e.g., all users included in the cluster share a common value of a data field included in the log records). To illustrate and only as a non-limiting example, learner system 450 may perform a clustering operation on the contextual user data generated by contextual user data generator 440. As a result of performing the clustering operation, learner system 450 may cluster the plurality of users into four distinct clusters of users; specifically, cluster 550, cluster 560, cluster 570, and cluster 580. Learner system 450 may execute model selector 520 to select a selection model from selection models database 510. On the next round of prediction, model execution system 540 may input at least (1) the contextual user data for all of the users in cluster 550 and (2) the set of all available tasks into the selected selection model. As a result of inputting the contextual user data and the set of available tasks into the selection model, the selection model may generate an output. The output may be used to identify a subset of the set of available tasks, such that each task included in the subset of tasks is a task predicted to be useful for each user in cluster 550. Similarly, learner system 450 may repeat the above steps individually for each of clusters 560, 570, and 580. Advantageously, clustering contextual user data into one or more clusters, and then individually inputting each cluster of contextual user data into the selected multi-armed bandit model, solves the technical challenge of limited metadata or log records for a new user (e.g., the "cold start" problem). For example, if a new user has not interacted with any of the available applications in the past, then the log records would not include any log records representing interactions between this new user and any applications. To enable predictions to be made on the new user (without much contextual user data), learner system 450 clusters users to identify other users who are similar to the new users. Then, learner system 450 uses model execution system 540 to generate an output corresponding to a prediction of a subset of tasks for the cluster of users, which includes the new user. Accordingly, learner system 450 can generate an output corresponding to a prediction of tasks for the new user, despite there being a lack of information about the new user.

Figure 6:
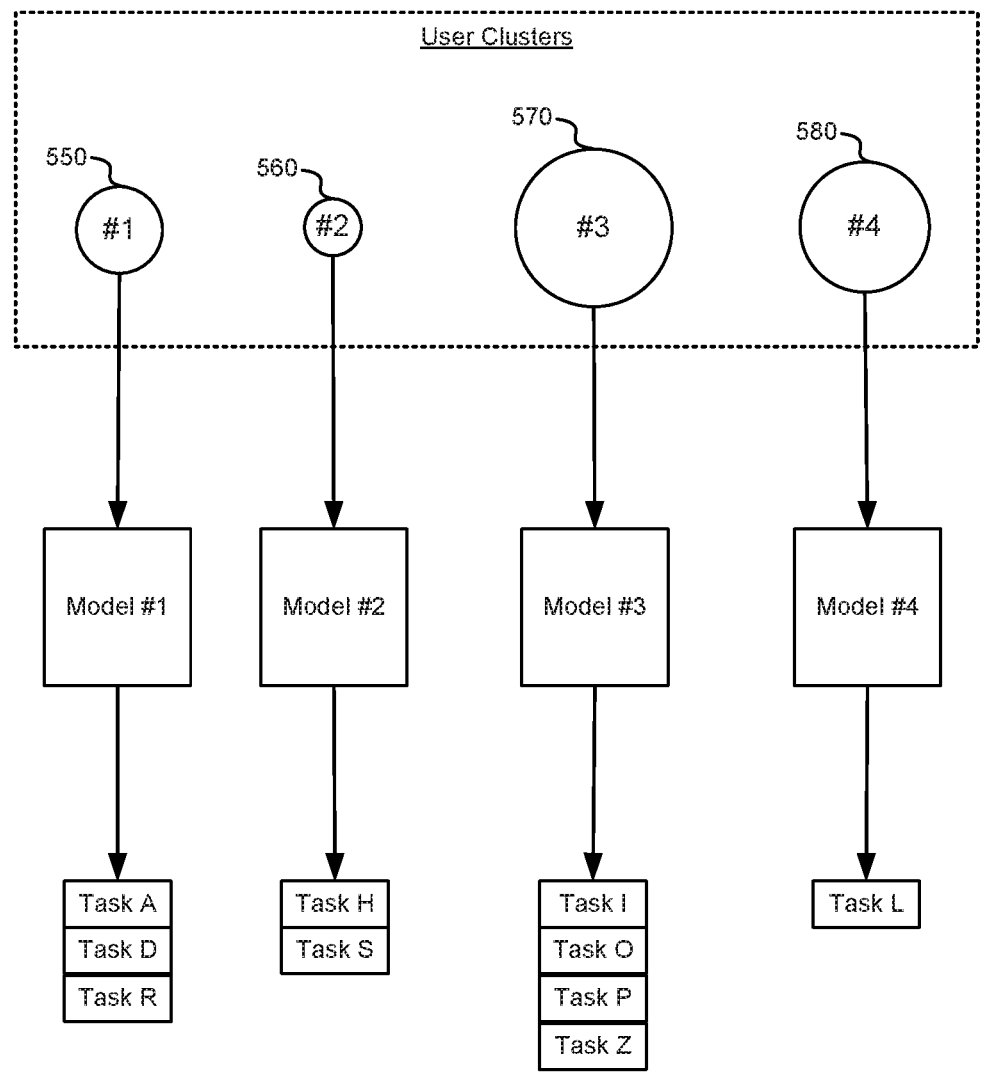
FIG. 6 is a block diagram illustrating an example process for clustering user data and selecting a multi-armed bandit model for each cluster.

FIG. 6 is a block diagram illustrating example process 600 for clustering contextual user data and selecting a multi-armed bandit model for each cluster. FIG. 6 continues with the non-limiting example of FIG. 5, in which four clusters were formed (cluster 550, cluster 560, cluster 570, and cluster 580) as a result of learner system 450 performing a clustering operation. The contextual user data for all users included in cluster 550 may be inputted into the selected multi-armed bandit model, which is model #1 (e.g., an upper confidence bound model). Model #1 may process the contextual user data for cluster 550 and the set of available tasks to generate an output. The output may be used to identify an incomplete subset of tasks from the set of available tasks. As illustrated in the non-limiting example of FIG. 6, the incomplete subset of tasks may be Task A, Task, D, and Task R.

Another multi-armed bandit model may be selected for user cluster 560. For example, the model selector may select model #2 (e.g., a Thompson sampling model) based on the accuracy or performance of the available models with respect to user cluster 560. As illustrated in the non-limiting example of FIG. 6, the incomplete subset of predicted tasks for the users of cluster 560 may be Task H and S. Additionally, the model selector may select model #3 for cluster 570 based on the accuracy or performance of various models with respect to cluster 570. As illustrated in the non-limiting example of FIG. 6, executing model #3 may result in the selection of Tasks I, O, P, and Z as the incomplete subset of tasks. Lastly, the model selector may select model #4 for cluster 580 based on the accuracy or performance of various models with respect to cluster 580. As illustrated in the non-limiting example of FIG. 6, executing model #4 may result in the selection of Task L only as the incomplete subset of tasks to present to the user or users. In some implementations, models #1 through #4 may be different models, and in other implementations, models #1 through #4 may be the same model.

Figure 7:
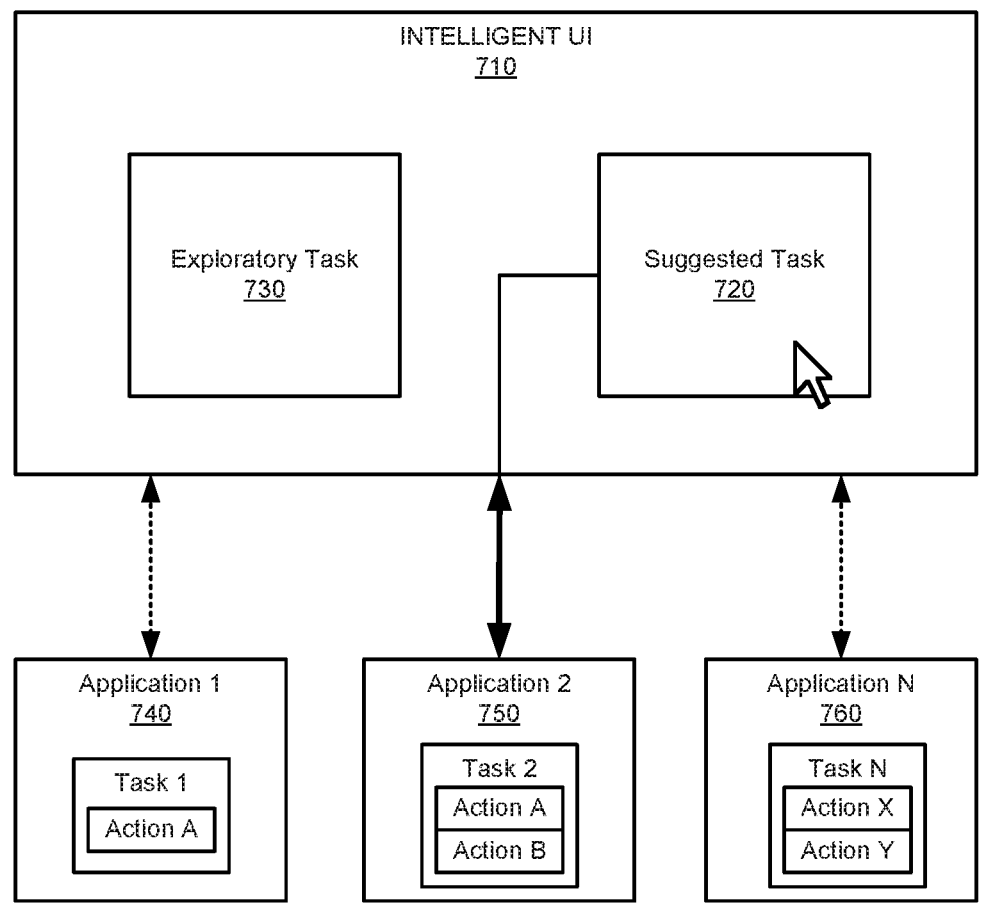
FIG. 7 is a block diagram illustrating a functional example of predicting tasks for users.

FIG. 7 is a block diagram illustrating a functional example of predicting tasks for users. Intelligent UI 710 may be an interface that is accessible to the users associated with an entity (e.g., an organization). For example, intelligent UI 710 may be an interface of an Intranet for a private network. Intelligent UI 710 can display links (e.g., or any other selectable element, such as a button, a menu object, etc.) to various cloud or locally-hosted applications. In the examples in which links are presented on intelligent UI 710, the links (when selected) may cause the user to be navigated to the corresponding application and/or may cause one or more specific tasks to be automatically performed without navigating the user away from intelligent UI 710. An API or other exposed interface may enable the intelligent UI 710 to interact with any application. Further, applications may be web applications or mobile applications that natively run on mobile devices.

As illustrated in the example of FIG. 7, intelligent UI 710 can display suggested task 720 and/or exploratory task 730. Suggested task 720 may be a task that is predicted based on a result of inputting a user vector associated with the user into the contextual learner (e.g., learner system 450). For example, if the user regularly accesses a time and attendance application on Friday afternoons, the contextual learner will suggest a link to the time and attendance application any time the user accesses the intelligent UI 710 on Friday afternoons. However, since the intelligent UI 710 is dynamic, the intelligent UI 710 may not display the link to the time and attendance application on that Friday morning (since the time and attendance application may not be relevant for the user on Friday morning). In some implementations, intelligent UI 710 may also display exploratory task 730. Exploratory task 730 may be a task that is randomly selected to be displayed on intelligent UI 710. In some examples, exploratory task 730 may be selected from a set of tasks that are predefined by an entity.

Each task displayed (e.g., as a link) on intelligent UI 710 may be configured to communicate with an API (or any other exposed interface) that can access the corresponding application. For example, suggested task 720 may be a link displayed on intelligent UI 710 that, when selected by a user, can access Application 2 750 using an API. As a non-limiting example, if the user selects suggested task 720, then the API can be triggered to access Application 2 750 to perform task 2. Task 2 may include Action A and Action B. The selection of the link representing suggested task 720 can cause the API to access Application 2 750 and execute the code that performs Actions A and B. In this example, tasks handled by Application 1 740 through Application N 760 were unselected during the user's session on the intelligent UI.

Figure 8:
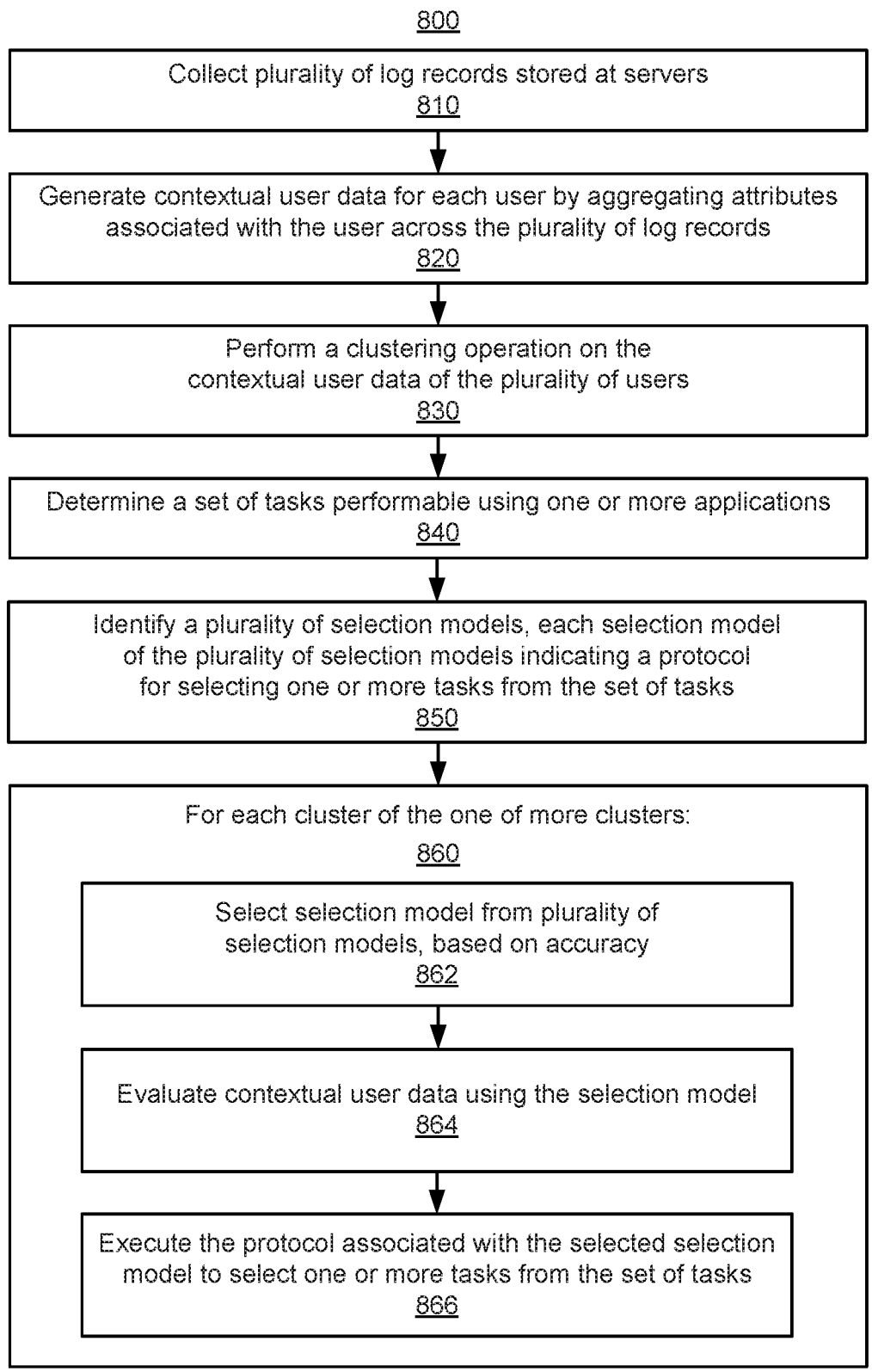
FIG. 8 is a flowchart illustrating an example process for predicting tasks for users to complete.

FIG. 8 illustrates a flowchart illustrating example process 800 for predicting tasks for users to complete. Process 800 may be performed by any of the hardware-based computing devices described herein (e.g., learner system 450, intelligent UI generator 470, contextual user data generator 440 and so on). Further, process 800 may be performed at every instance that an intelligent UI is loaded onto a browser of a user device (e.g., a mobile phone, laptop or desktop computer). Performing process 800 enables an incomplete subset of tasks to be selected from a full set of tasks, such that the tasks selected to be included in the incomplete subset are specific to the user accessing the intelligent UI. The tasks of the incomplete subset are predicted for the user to complete based on factors, including previous tasks performed by the user or other similar users.

Process 800 begins at block 810 where a plurality of log records is stored at one or more servers across a network. The log records may capture user interactions with one or more applications. For example, a log record may capture an interaction, in which user A selects task A while using application A. Each log record of the plurality of log records may represent one or more attributes of an interaction between a user device and an application (e.g., timestamp of interaction, identifier of task selected for performance, application identifier, user identifier, and other suitable attributes). The application may facilitate performance of one or more tasks, and the interaction may be associated with a task previously selected by a user using the application.

At block 820, the contextual user data generator may generate contextual user data for each user of a plurality of users associated with an entity. The contextual user data for each user of the plurality of users may be generated by aggregating the one or more attributes associated with the user across the plurality of log records. For example, if there are a 1000 log records that include the user identifier for user A, then the contextual user data generator may aggregate all of the metadata record in those 1000 log records and store that data in association with user A. Thus, for example, the stored data is contextual to user A.

At block 830, a clustering operation may be performed on the contextual user data of the plurality of users (e.g., by the learner system or the contextual user data generator). As a non-limiting example, the clustering operation may be a k-means clustering technique. The performance of the clustering operation may cause the formation of one or more clusters of users. Each cluster of the one or more clusters may represent one or more users that share a common attribute. As a non-limiting example, a cluster of new users (e.g., users for which there is limited data recorded in log records) may be formed as a result of performing the clustering operation.

At block 840, a full set of tasks available to be performed may be stored at the performable tasks data store. The full set of performable tasks may correspond to a specific application. The performable tasks data store may store executable code that, when executed, causes a task to be performed. Further, the performable task data store may store multiple full sets of tasks for various applications, such that a single set of tasks corresponds to a single application. Each task of the set of tasks may include one or more actions performable using an application of the one or more applications. As a non-limiting example, a task for complete a form may include four separate actions, including retrieving the form, displaying the form, automatically completing at least a portion of the form, and saving the completed form.

At block 850, the learner system may identify a plurality of selection models. Each selection model of the plurality of selection models may be associated with a protocol for selecting one or more tasks from the set of tasks. For example, the protocol may be or may include the execution of a multi-armed bandit algorithm or model that, when executed, automatically selects an incomplete subset of tasks from the set of available tasks. An accuracy or performance value may be determined for each selection model of the plurality of selection models. For example, an accuracy may be determined on whether or not a user selects a task from the incomplete subset of tasks that are presented on the intelligent UI. If a task from the incomplete subset of tasks is selected by a user during a time period (e.g., during a session in which the user is navigating the intelligent UI, over an hour, over a day, over a week, over a month, etc.), then a feedback signal may be transmitted back to the learner system to indicate that the multi-armed bandit model accurately predicted that the user would select that task. If a task from the incomplete subset of tasks is not selected over the time period (the same or a different time period), then the multi-armed bandit model that selected that task did not accurately predict that the user would complete that task. Thus, the model's performance or accuracy may be reduced. The accuracy for each selection model may be cumulatively calculated or updated for each iteration of prediction. For instance, an iteration of prediction may be a single session in which the user browses the intelligent UI. As a non-limiting example, the accuracy may be calculated by calculating a cumulative average score for each iteration of prediction. If any tasks of an incomplete subset of tasks are selected, then, for example, a "1" may be added to the cumulative score for each tasks selected. A "0" or a negative value (e.g., −1) may be added to the cumulative score for each suggested task that was not selected during the time period. Advantageously, if the accuracy of the selected model decreases, then, when the next most accurate model becomes the most accurate model, the next most accurate model would be selected to be executed during the next iteration of prediction to select an incomplete subset of tasks using the techniques included in that model (e.g., Thompson sampling may be one model and upper confidence bound selection may be the other model). Thus, the most accurate model would always be executed, even as the accuracy of the selected model decline for any reason.

At block 860, for each cluster of the one or more clusters formed at block 830, block 862 may be performed by selecting a model (e.g., a multi-armed bandit algorithm) from the plurality of selection models. The selection of the model may be based on the cumulative accuracy of the model. For example, the learner system (using the model selector) may evaluate the cumulative accuracy of each model of the plurality of models and select the model that corresponds to the highest cumulative accuracy. If there is a tie between two or more models, the learner system may select the most-recently executed model or randomly select one of those models.

At block 864, at the next iteration of prediction (e.g., the next time the user loads the intelligent UI, when the user begins a new session with the intelligent UI, or when the time period has ended), the selected model may be executed. Executing the selected model may cause the contextual user data for that cluster to be evaluated using the model. The executed model may also process the set of available tasks. At block 866, the execution of the selected model (e.g., the protocol) may cause the selection of an incomplete subset of tasks from the set of tasks. The incomplete subset of tasks may be specifically selected for the user or based on the contextual user data associated with the cluster of users. Thus, even if there is insufficient data for that user, the learner system can still accurately predict tasks for that user by evaluating the contextual user data of the cluster associated with the user. Each task of the incomplete subset of tasks may be presented on the intelligent UI, such that a link may represent a task, and if the link is selected, the selection of the link may cause the application associated with the task to automatically perform the task.

Figure 9:
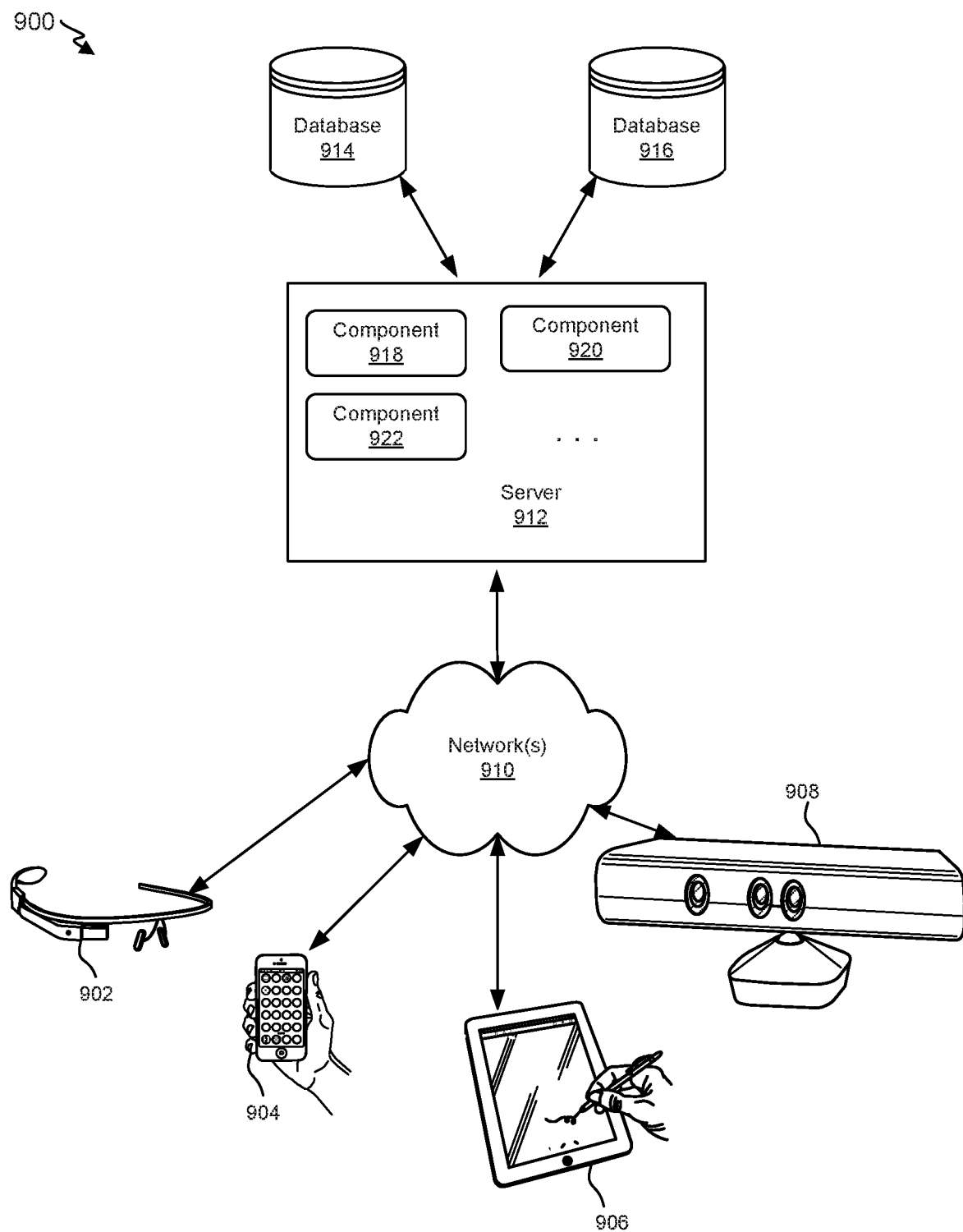
FIG. 9 is a simplified diagram illustrating a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
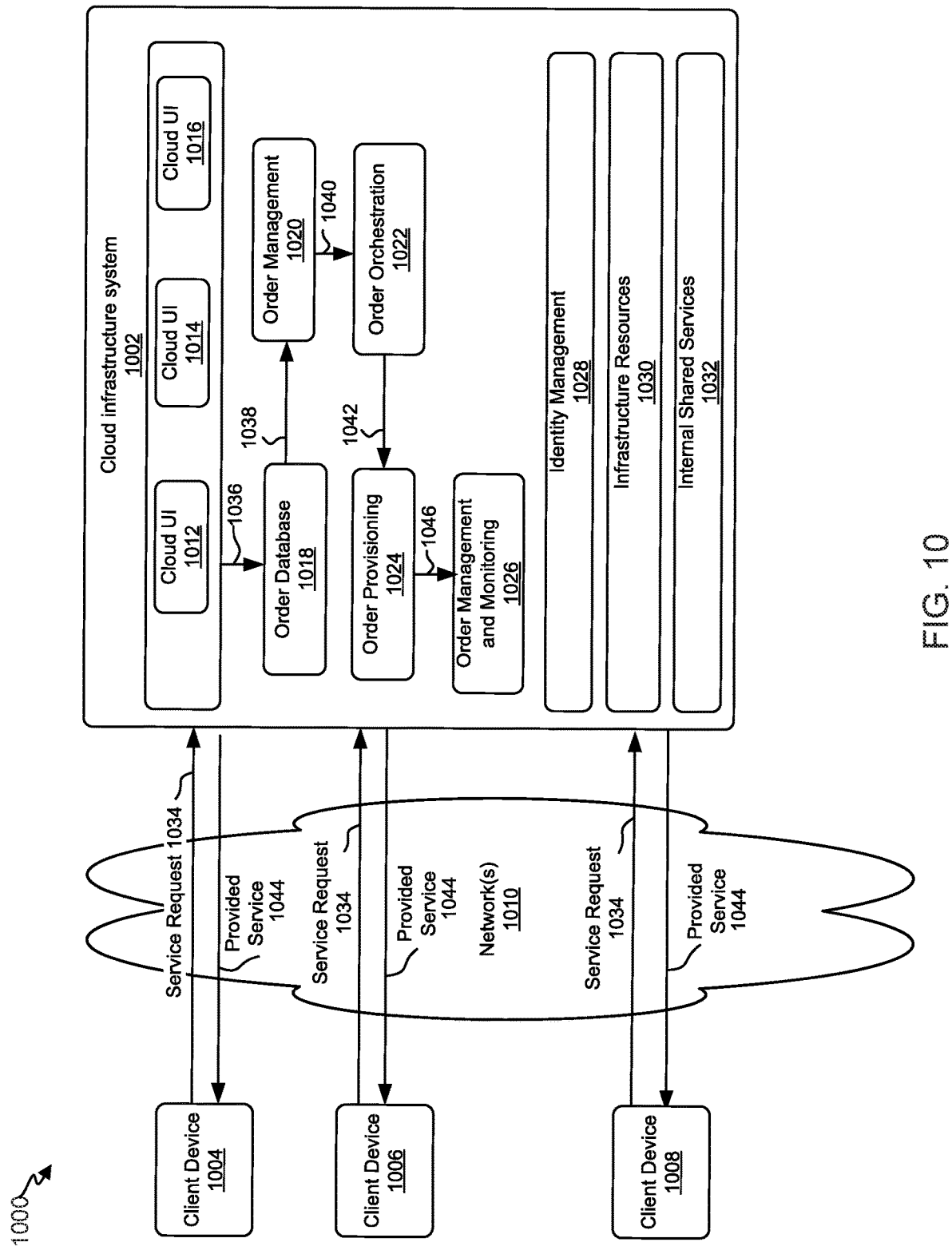
FIG. 10 is a simplified block diagram illustrating one or more components of a system environment.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 802 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of processes associated with each order and applies logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
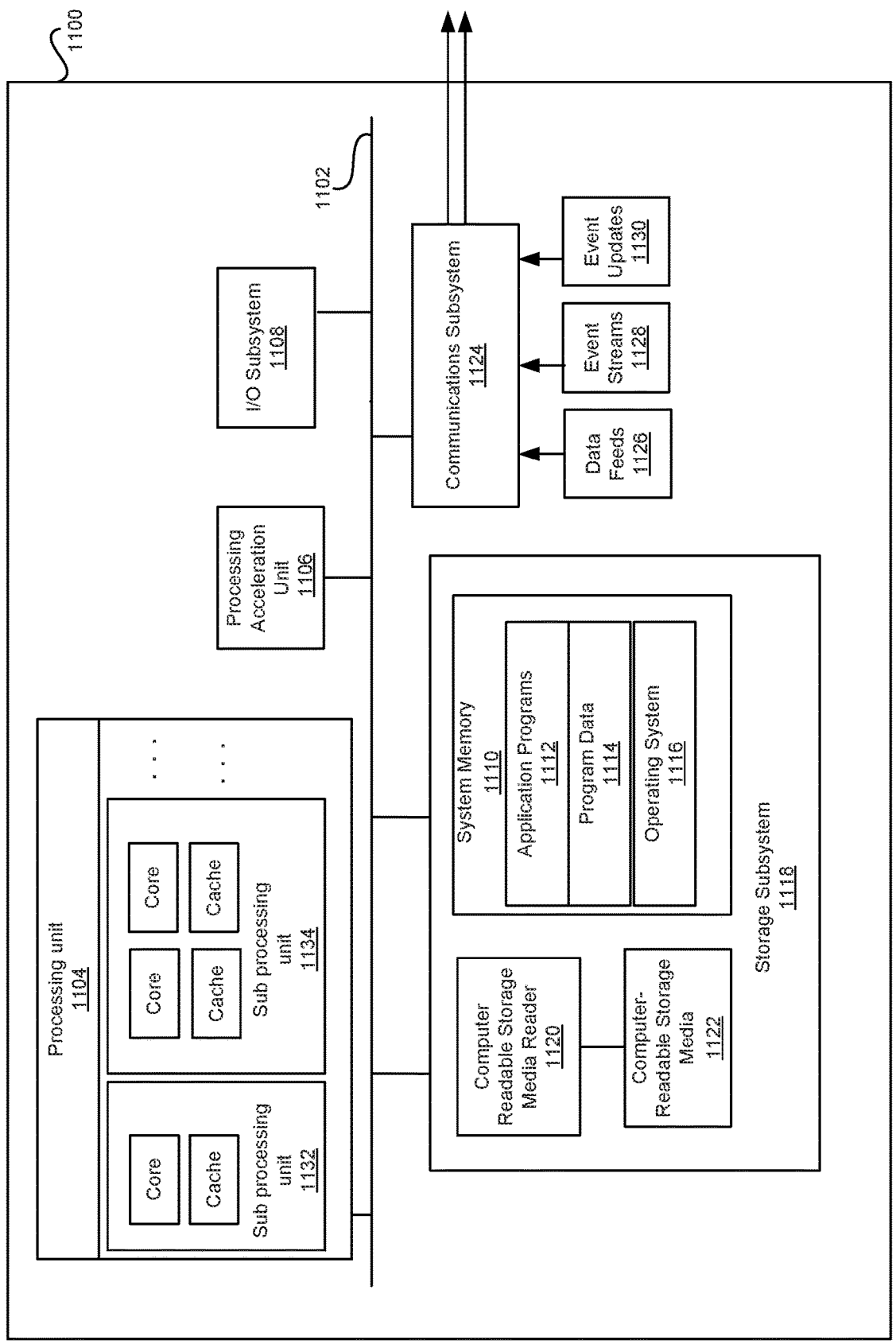
FIG. 11 illustrates an exemplary computer system, in which various embodiments of the present invention may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
collecting a plurality of log records stored at one or more servers, each log record of the plurality of log records representing one or more attributes of an interaction between a user device and an application, the application facilitating performance of one or more tasks, and the interaction being associated with a task previously selected by a user using the application;
generating contextual user data for each user of a plurality of users, the contextual user data for each user of the plurality of users being generated by aggregating the one or more attributes associated with the user across the plurality of log records;
performing, by a processor, a clustering operation on the contextual user data of the plurality of users using a machine-learning technique, the performance of the clustering operation causing a formation of one or more clusters of users, and each cluster of the one or more clusters representing one or more users that share a common attribute;
determining a set of tasks performable using one or more applications, each task of the set of tasks including one or more actions performable using an application of the one or more applications;
identifying a plurality of selection models, each selection model of the plurality of selection models indicating a protocol for selecting one or more tasks from the set of tasks, and each selection model of the plurality of selection models being associated with an accuracy; and
for each cluster of the one of more clusters:
selecting a selection model from the plurality of selection models, the selection being based on the accuracy of the selection model as compared to an accuracy of remaining selection models of the plurality of selection models;
evaluating, using the selected selection model, the contextual user data of the one or more users included in the cluster and the set of tasks; and
in response to the evaluation, executing the protocol associated with the selected selection model to select one or more tasks from the set of tasks, the selection of the one or more tasks corresponding to a recommendation of selectable tasks for presentation to the one or more users included in the cluster.

2. The computer-implemented method of claim 1, wherein the plurality of selection models includes at least one multi-armed bandit machine learning algorithm.

3. The computer-implemented method of claim 1, further comprising:
selecting one or more additional tasks from the set of tasks, each of the one or more additional tasks being selected as part of an exploration strategy to optimize the one or more tasks predicted to be taken by a particular user device, and wherein the one or more additional tasks are not determined based on a previous task performed in association with the particular user device.

4. The computer-implemented method of claim 1, further comprising:
receiving an indication that a task of the one or more tasks was selected by a user;
in response to receiving the indication; generating a positive feedback signal indicating that the selected task was selected; and
updating the accuracy associated with the selection model used to select the selected task for presentation to the user, wherein the positive feedback signal causes the selection model to bias predicted tasks towards the selected task.

5. The computer-implemented method of claim 1, further comprising:
determining that a task of the one or more tasks presented to the user was unselected;
generating a negative feedback signal indicating that the task was unselected; and
updating the accuracy associated with the selection model used to select the unselected task for presentation to the user, wherein the negative feedback signal causes the selection model to bias predicted tasks away from the unselected task.

6. The computer-implemented method of claim 1, further comprising:
calculating the accuracy associated with each selection model of the plurality of selection models, the accuracy indicating a success rate of predicted tasks, and the accuracy being recalculated each instance the selection model is executed to select the one or more tasks for presenting to the user.

7. The computer-implemented method of claim 1, further comprising:
displaying an interface that presents the one or more tasks selected using the selection model;
receiving input at the interface, the input corresponding to a selection of a presented task of the presented one or more tasks; and
in response to receiving the input, accessing the application associated with the selected task, the application associated with the selected task being configured to perform the selected task;
identifying, using the application, one or more actions associated with the selected task; and
automatically performing the one or more actions by triggering the application to perform the one or more actions in response to the received input.

8. A system, comprising:
one or more data processors; and
a non-transitory computer-readable storage medium containing instructions which, when executed on the one or more data processors, cause the one or more data processors to perform operations including:
collecting a plurality of log records stored at one or more servers, each log record of the plurality of log records representing one or more attributes of an interaction between a user device and an application, the application facilitating performance of one or more tasks, and the interaction being associated with a task previously selected by a user using the application;
generating contextual user data for each user of a plurality of users, the contextual user data for each user of the plurality of users being generated by aggregating the one or more attributes associated with the user across the plurality of log records;
performing a clustering operation on the contextual user data of the plurality of users using a machine-learning technique, the performance of the clustering operation causing a formation of one or more clusters of users, and each cluster of the one or more clusters representing one or more users that share a common attribute;

determining a set of tasks performable using one or more applications, each task of the set of tasks including one or more actions performable using an application of the one or more applications;

identifying a plurality of selection models, each selection model of the plurality of selection models indicating a protocol for selecting one or more tasks from the set of tasks, and each selection model of the plurality of selection models being associated with an accuracy; and for each cluster of the one of more clusters:
  selecting a selection model from the plurality of selection models, the selection being based on the accuracy of the selection model as compared to an accuracy of remaining selection models of the plurality of selection models;
  evaluating, using the selected selection model, the contextual user data of the one or more users included in the cluster and the set of tasks; and
  in response to the evaluation, executing the protocol associated with the selected selection model to select one or more tasks from the set of tasks, the selection of the one or more tasks corresponding to a recommendation of selectable tasks for presentation to the one or more users included in the cluster.

9. The system of claim 8, wherein the plurality of selection models includes at least one multi-armed bandit machine learning algorithm.

10. The system of claim 8, wherein the operations further comprise:
  selecting one or more additional tasks from the set of tasks, each of the one or more additional tasks being selected as part of an exploration strategy to optimize the one or more tasks predicted to be taken by a particular user device, and wherein the one or more additional tasks are not determined based on a previous task performed in association with the particular user device.

11. The system of claim 8, wherein the operations further comprise:
  receiving an indication that a task of the one or more tasks was selected by a user;
  in response to receiving the indication, generating a positive feedback signal indicating that the selected task was selected; and
  updating the accuracy associated with the selection model used to select the selected task for presentation to the user, wherein the positive feedback signal causes the selection model to bias predicted tasks towards the selected task.

12. The system of claim 8, wherein the operations further comprise:
  determining that a task of the one or more tasks presented to the user was unselected;
  generating a negative feedback signal indicating that the task was unselected; and
  updating the accuracy associated with the selection model used to select the unselected task for presentation to the user, wherein the negative feedback signal causes the selection model to bias predicted tasks away from the unselected task.

13. The system of claim 8, wherein the operations further comprise:
  calculating the accuracy associated with each selection model of the plurality of selection models, the accuracy indicating a success rate of predicted tasks, and the accuracy being recalculated each instance the selection model is executed to select the one or more tasks for presenting to the user.

14. The system of claim 8, wherein the operations further comprise:
  displaying an interface that presents the one or more tasks selected using the selection model;
  receiving input at the interface, the input corresponding to a selection of a presented task of the presented one or more tasks; and
  in response to receiving the input, accessing the application associated with the selected task, the application associated with the selected task being configured to perform the selected task;
  identifying, using the application, one or more actions associated with the selected task; and
  automatically performing the one or more actions by triggering the application to perform the one or more actions in response to the received input.

15. A computer-program product tangibly embodied in a non-transitory machine-readable storage medium, including instructions configured to cause a data processing apparatus to perform operations including:
  collecting a plurality of log records stored at one or more servers, each log record of the plurality of log records representing one or more attributes of an interaction between a user device and an application, the application facilitating performance of one or more tasks, and the interaction being associated with a task previously selected by a user using the application;
  generating contextual user data for each user of a plurality of users, the contextual user data for each user of the plurality of users being generated by aggregating the one or more attributes associated with the user across the plurality of log records;
  performing a clustering operation on the contextual user data of the plurality of users using a machine-learning technique, the performance of the clustering operation causing a formation of one or more clusters of users, and each cluster of the one or more clusters representing one or more users that share a common attribute;
  determining a set of tasks performable using one or more applications, each task of the set of tasks including one or more actions performable using an application of the one or more applications;
  identifying a plurality of selection models, each selection model of the plurality of selection models indicating a protocol for selecting one or more tasks from the set of tasks, and each selection model of the plurality of selection models being associated with an accuracy; and
  for each cluster of the one of more clusters:
    selecting a selection model from the plurality of selection models, the selection being based on the accuracy of the selection model as compared to an accuracy of remaining selection models of the plurality of selection models;
    evaluating, using the selected selection model; the contextual user data of the one or more users included in the cluster and the set of tasks; and
    in response to the evaluation, executing the protocol associated with the selected selection model to select one or more tasks from the set of tasks, the selection of the one or more tasks corresponding to a recommendation of selectable tasks for presentation to the one or more users included in the cluster.

16. The computer-program product of claim 15, wherein the plurality of selection models includes at least one multi-armed bandit machine learning algorithm.

17. The computer-program product of claim 15, wherein the operations further comprise:
   selecting one or more additional tasks from the set of tasks, each of the one or more additional tasks being selected as part of an exploration strategy to optimize the one or more tasks predicted to be taken by a particular user device, and wherein the one or more additional tasks are not determined based on a previous task performed in association with the particular user device.

18. The computer-program product of claim 15, wherein the operations further comprise:
   receiving an indication that a task of the one or more tasks was selected by a user;
   in response to receiving the indication, generating a positive feedback signal indicating that the selected task was selected; and
   updating the accuracy associated with the selection model used to select the selected task for presentation to the user, wherein the positive feedback signal causes the selection model to bias predicted tasks towards the selected task.

19. The computer-program product of claim 15, wherein the operations further comprise:
   determining that a task of the one or more tasks presented to the user was unselected;
   generating a negative feedback signal indicating that the task was unselected; and
   updating the accuracy associated with the selection model used to select the unselected task for presentation to the user, wherein the negative feedback signal causes the selection model to bias predicted tasks away from the unselected task.

20. The computer-program product of claim 15, wherein the operations further comprise:
   calculating the accuracy associated with each selection model of the plurality of selection models, the accuracy indicating a success rate of predicted tasks, and the accuracy being recalculated each instance the selection model is executed to select the one or more tasks for presenting to the user.

* * * * *

UNITED STATES PATENT AND TRADEMARK OFFICE
CERTIFICATE OF CORRECTION

PATENT NO. : 11,263,241 B2
APPLICATION NO. : 16/569449
DATED : March 1, 2022
INVENTOR(S) : Rezaeian et al.

It is certified that error appears in the above-identified patent and that said Letters Patent is hereby corrected as shown below:

In the Specification

In Column 8, Line 67, delete "that that" and insert -- that --, therefor.

In the Claims

In Column 38, Line 1, in Claim 4, delete "indication;" and insert -- indication, --, therefor.

In Column 40, Line 63, in Claim 15, delete "model;" and insert -- model, --, therefor.

Signed and Sealed this
Ninth Day of August, 2022

Katherine Kelly Vidal
*Director of the United States Patent and Trademark Office*